United States Patent
Parichehrehteroujeni et al.

(10) Patent No.: US 11,723,081 B2
(45) Date of Patent: Aug. 8, 2023

(54) METHODS PROVIDING INFORMATION MESSAGES INCLUDING RACH REPORTS AND RELATED WIRELESS DEVICES

(71) Applicant: Telefonaktiebolaget LM Ericsson (publ), Stockholm (SE)

(72) Inventors: Ali Parichehrehteroujeni, Linköping (SE); Pradeepa Ramachandra, Linköping (SE); Angelo Centonza, Torrenueva Costa Granada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/782,853

(22) PCT Filed: Aug. 19, 2020

(86) PCT No.: PCT/SE2020/050798
§ 371 (c)(1),
(2) Date: Jun. 6, 2022

(87) PCT Pub. No.: WO2021/118424
PCT Pub. Date: Jun. 17, 2021

(65) Prior Publication Data
US 2023/0021820 A1    Jan. 26, 2023

Related U.S. Application Data

(60) Provisional application No. 62/945,508, filed on Dec. 9, 2019.

(51) Int. Cl.
*H04W 74/08* (2009.01)
*H04W 60/00* (2009.01)

(52) U.S. Cl.
CPC ..... *H04W 74/0858* (2013.01); *H04W 60/005* (2013.01)

(58) Field of Classification Search
CPC ............ H04W 74/0858; H04W 60/005
See application file for complete search history.

(56) References Cited

U.S. PATENT DOCUMENTS

| 2014/0036817 A1* | 2/2014 | Chang ............... H04W 72/0446 |
| | | 370/329 |
| 2014/0241285 A1 | 8/2014 | Pang et al. |

(Continued)

FOREIGN PATENT DOCUMENTS

| JP | 2009-111624 A | 5/2009 | |
| WO | WO-2013064103 A1 * | 5/2013 | ........ H04W 74/0833 |
| WO | 2019018831 A1 | 1/2019 | |

OTHER PUBLICATIONS

Random Access Parameter Processing method and device, English translation for WO 2013/064103 (Year: 2013).*

(Continued)

*Primary Examiner* — Marisol Figueroa
(74) *Attorney, Agent, or Firm* — Sage Patent Group

(57) ABSTRACT

A wireless device registers with a first PLMN having a first PLMN identity. A first plurality of RA procedures is performed while registered with the first PLMN. First information related to the first plurality of RA procedures is stored. The wireless device registers with a second PLMN having a second PLMN identity different than the first PLMN identity after registering with the first PLMN and after performing the first plurality of RA procedures. The first information is discarded responsive to registering with the second PLMN. A second plurality of RA procedures is performed while registered with the second PLMN. Second information related to the second plurality of RA procedures is stored. An information message is transmitted to the second PLMN. The information message includes a plural- (Continued)

At t0, UE selects SSB 63
Preamble power P0
RAR is NOT received.

At t1, UE selects SSB 63 again
P1 = P0 + offset
RAR is NOT received.

ity of RACH reports corresponding to the second plurality of RA procedures based on the second information.

14 Claims, 22 Drawing Sheets

(56) References Cited

U.S. PATENT DOCUMENTS

2017/0295497 A1* 10/2017 Macmullan ............ H04W 24/02
2020/0413450 A1* 12/2020 Kim ...................... H04W 36/08
2022/0132613 A1*  4/2022 Chang ................... H04W 88/06

OTHER PUBLICATIONS

International Search Report and Written Opinion of the International Searching Authority for PCT International Application No. PCT/SE2020/050798 dated Oct. 30, 2020.
Catt, "Leftover Issues for RACH Report Optimization," R2-1914499, 3GPP TSG-RAN WG2 Meeting #108, Reno, USA, Nov. 18-22, 2019, 4 pages.
International Preliminary Report on Patentability for PCT International Application No. PCT/SE2020/050798 dated Dec. 13, 2021.
3GPP TS 36.321 V15.7.0, "3rd Generation Partnership Project; Technical Specification Group Radio Access Network; Evolved Universal Terrestrial Radio Access (E-UTRA); Medium Access Control (MAC) protocol specification (Release 15)," Sep. 2019, 134 pages.
3GPP TS 36.331 V15.7.0, "3rd Generation Partnership Project; Technical Specification Group Radio Access Network; Evolved Universal Terrestrial Radio Access (E-UTRA); Radio Resource Control (RRC); Protocol specification (Release 15)," Sep. 2019, 962 pages.
3GPP TS 38.300 V15.7.0, "3rd Generation Partnership Project; Technical Specification Group Radio Access Network; NR; NR and NG-RAN Overall Description; Stage 2 (Release 15)," Sep. 2019, 99 pages.
3GPP TS 38.321 V15.7.0, "3rd Generation Partnership Project; Technical Specification Group Radio Access Network; NR; Medium Access Control (MAC) protocol specification (Release 15)," Sep. 2019, 78 pages.
3GPP TS 38.331 V15.7.0, "3rd Generation Partnership Project; Technical Specification Group Radio Access Network; NR; Radio Resource Control (RRC) protocol specification (Release 15)," Sep. 2019, 527 pages.
3GPP TS 38.423 V15.5.0, "3rd Generation Partnership Project; Technical Specification Group Radio Access Network; NG-RAN; Xn application protocol (XnAP) (Release 15)," Sep. 2019, 311 pages.
3GPP TS 38.473 V15.7.0, "3rd Generation Partnership Project; Technical Specification Group Radio Access Network; NG-RAN; F1 application protocol (F1AP) (Release 15)," Sep. 2019, 221 pages.
Catt (Rapporteur), "Output of Email Discussion [107#45][NRSON] RACH and Mobility Robustness Optimisation Checking," R2-1912147, 3GPP TSG-RAN WG2 Meeting #107bis, Chongqing, P.R.China, Oct. 14-18, 2019, 38 pages.
Notice of Allowance for Japanese Patent Application No. 2022-524260 dated Apr. 25, 2023, 3 pages.
Ericsson, "Open issues related to RACH Report," Tdoc R2-1915433, 3GPP TSG-RAN WG2 #108, Reno, US, 18th Oct.-Nov. 22, 2019, 10 pages.

* cited by examiner

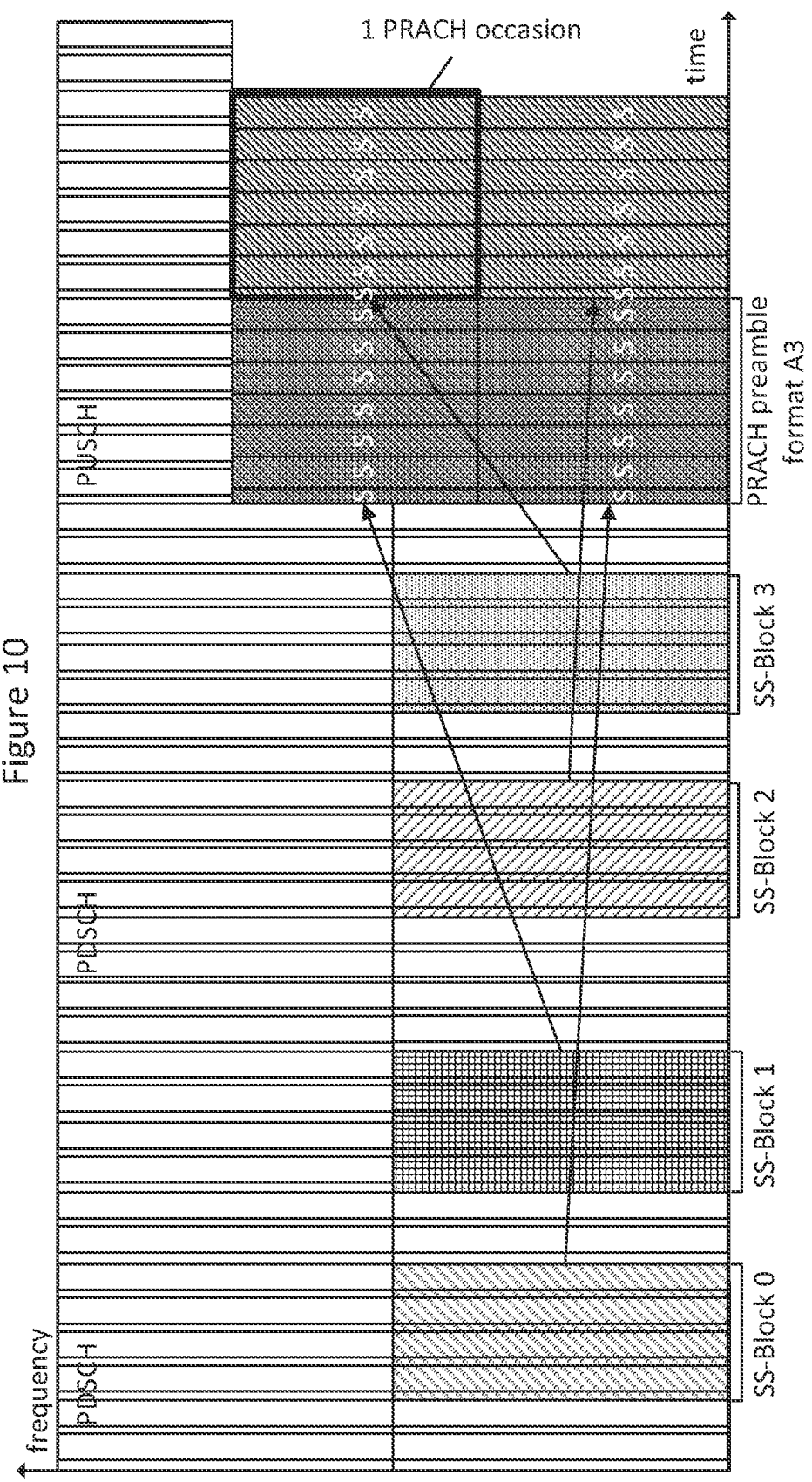

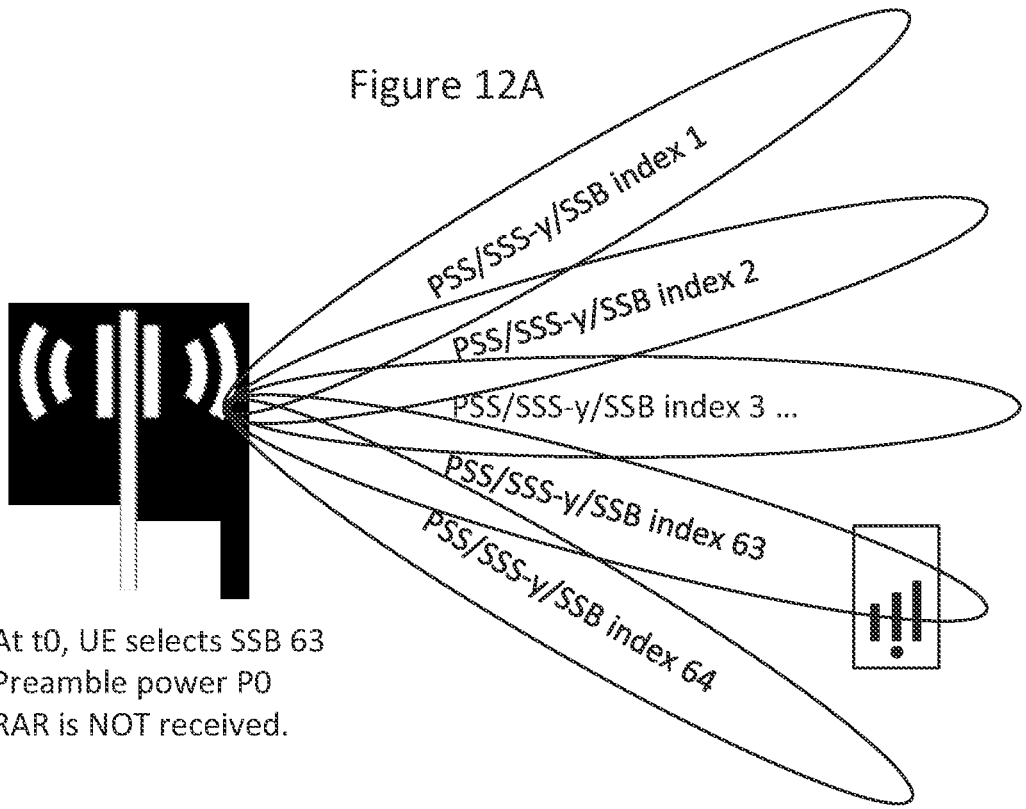
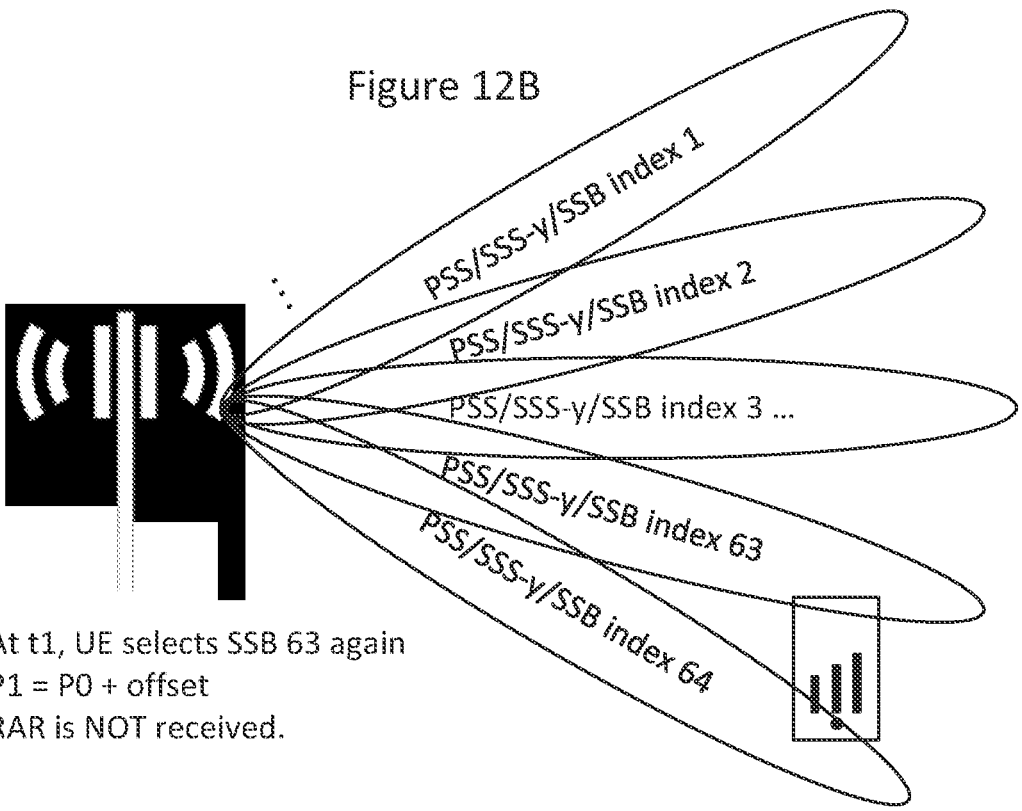

At t2, UE selects SSB 64
P1 = P0 + offset
RAR is received.

METHODS PROVIDING INFORMATION MESSAGES INCLUDING RACH REPORTS AND RELATED WIRELESS DEVICES

CROSS REFERENCE TO RELATED APPLICATIONS

This application is a 35 U.S.C. § 371 national stage application of PCT International Application No. PCT/SE2020/050798 filed on Aug. 19, 2020, which claims the benefit of U.S. Provisional Patent Application Ser. No. 62/945,508, filed on Dec. 9, 2019, the disclosures and content of which are incorporated by reference herein in their entireties.

TECHNICAL FIELD

The present disclosure relates generally to communications, and more particularly to communication methods and related devices and nodes supporting wireless communications.

BACKGROUND

RACH (Random Access CHannel) improvement/optimization in LTE (Long Term Evolution) is discussed below.

Improvement/Optimization of the RACH configuration in cells is a Release 9 SON feature that is key to optimizing the system performance of a mobile network. A poorly configured RACH may result in higher call setup and handover delays due to frequent RACH collisions, or low preamble-detection probability and limited coverage. The amount of uplink resource reserved for RACH also affects the system capacity. Therefore, a network operator should carefully monitor that the RACH parameters are appropriately set, considering factors such as the RACH load, the uplink interference, the traffic patterns and the population under the cell coverage. The task becomes more complicated given that these factors may change dynamically. For example, if the antenna tilt is changed in a cell, it will affect the rates of call arrival and handover in this cell and the surrounding cells, and therefore the RACH load per preamble in all those cells. A change in transmission power settings or handover thresholds may have similar effects.

Whenever such a network configuration change happens, the RACH self-optimization feature should automatically make appropriate measurements of the RACH performance and usage in all the affected cells and determine any necessary updates of the RACH parameters. Some useful measurements are UE reports of the number of RACH attempts needed to obtain access, or time elapsed from the first attempt until access is finally granted. RACH parameters that can then be adjusted typically include one or more of the following: Split of RACH preambles between contention-free access, contention-based access with high payload and contention-based access with low payload; RACH back-off parameter value or the RACH transmission power ramping parameters; and/or Any other parameter may be adjusted if found useful by network operator.

In addition, the RACH optimization feature facilitates automatic configuration of PRACH parameters (including the PRACH (Physical Random Access Channel) resource configuration, preamble root sequence and cyclic shift configuration) to avoid preamble collisions with neighbouring cells. The principle of this automatic configuration is similar to the automatic PCI (Physical Cell Identifier) configuration SON (Self Optimized/Organized Network) feature: the PRACH configuration information is included in the 'X2 Setup' and 'eNB Configuration Update' procedures. Therefore, whenever a new eNodeB is initialized and learns about its neighbours via the ANR (Automatic Neighbor Relations) function, it can at the same time learn the neighbouring PRACH configurations. It can then select its own PRACH configuration to avoid conflicts with the neighbouring ones.

Whenever a conflict is identified, one of the cells should change its configuration, but the algorithm for selecting which cell should change and in what manner is not specified. The network operator can also combine PRACH self-optimization with manual configuration if necessary, but this is typically more prone to errors and more time consuming than automatic RACH optimization. Reporting of RACH information and failures.

Logging and reporting of RACH information in LTE is discussed below.

In LTE the report of RACH information when random access procedure is performed may be requested by the network via the UE Information procedure in RRC (section 5.6.5), in the case where a RACH procedure was successful. That procedure is summarized below, as described in RRC (Radio Resource Control) specifications.

UE (User Equipment) Information from Sections 5.6.5, 5.6.5.1, 5.6.5.2, and 5.6.5.3 of 3GPP TS 36.331 V15.7.0 (2019-09), referred to as Reference [1], is discussed below. A UE information procedure is provided in FIG. 6.5.6.1-1 of Reference [1], which is reproduced as FIG. 4.

The UE information procedure is used by the E-UTRAN (Evolved Universal Mobile Telecommunications System Terrestrial Radio Access Network) to request the UE to report information.

As discussed in Section 5.6.5.2 of Reference [1], the E-UTRAN initiates the procedure by sending the UEInformationRequest message. E-UTRAN should initiate this procedure only after successful security activation.

Reception of the UEInformationRequest message is discussed in Section 5.6.5.3 of Reference [1].
Upon receiving the UEInformationRequest message, the UE shall, only after successful security activation:
  1> if rach-ReportReq is set to true, set the contents of the rach-Report in the UEInformationResponse message as follows:
    2> set the numberOfPreamblesSent to indicate the number of preambles sent by MAC for the last successfully completed random access procedure;
    2> if contention resolution was not successful as specified in TS 36.321 [6] for at least one of the transmitted preambles for the last successfully completed random access procedure:
      3> set the contentionDetected to true;
    2> else:
      3> set the contentionDetected to false;
  1> else:
    2> submit the UEInformationResponse message to lower layers for transmission via SRB1;
The UEInformationRequest is the command used by E-UTRAN to retrieve information from the UE.

The UEInformationResponse message is used by the UE to transfer the information requested by the E-UTRAN.

In summary, for each RACH procedure the UE stores and possibly reports if contention was detected for at least one of the transmitted preambles, as described in TS 36.321, also referred to as Reference [2]. Random access in LTE may either be configured as contention-based random access (CBRA), and implying an inherent risk of collision, or contention-free, where resources are reserved by the network to a given UE at a given time.

In a CBRA procedure, a RACH preamble is randomly chosen by the UE, which may result in more than one UE simultaneously transmitting the same signature, leading to a need for a subsequent contention resolution process. For some use cases where random access is used, e.g., handovers, the eNodeB has the option of preventing contention occurring by allocating a dedicated signature to a UE, resulting in contention-free access. This is faster than contention-based access—a particularly important factor for the case of handover, which is time-critical, though it requires the network to reserve resources, which may not be very efficient. A fixed number (64) of preambles is available in each LTE cell, and the operation of the two types of RACH procedure depends on a partitioning of these signatures between those for contention-based access and those reserved for allocation to specific UEs on a contention-free basis.

In LTE, the UE may obtain RACH configuration in SIB2 (System Information Block 2), in the IE (Information Element) RadioResourceConfigCommonSIB, e.g. when it transitions from idle to connected, or in RadioResourceConfigCommon, when it is handed over to another cell. In both cases the UE contains the field rach-ConfigCommon of IE RACH-ConfigCommon.

The CBRA procedure is summarized below with respect to the message diagram of FIG. 5.

RACH preamble transmission is discussed with respect to Operation 1 of FIG. 5. In Operation 1, the UE shall select a preamble to be transmit. The UE selects one of the available preambles for CBRA (which is 64 minus the number of preambles reserved for CFRA, Contention Free Random Access). This maximum value is provided in as shown in Table 1 for the rach-ConfigCommon information element.

TABLE 1

| numberOfRA-Preambles | ENUMERATED { n4, n8, n12, n16, n20, n24, n28, n32, n36, n40, n44, n48, n52, n56, n60, n64} |
|---|---|

The set of contention-based signatures is further subdivided into two subgroups, so that the choice of signature can carry one bit of information relating to the amount of transmission resource needed to transmit the message at Step 3.

From a L1 (Layer 1) perspective, the preamble is transmitted in the so-called Physical Random-Access Channel (PRACH), which is time- and frequency-multiplexed with PUSCH (Physical Uplink Shared Channel) and PUCCH (Physical Uplink Control Channel) as shown in FIG. 6.

At the network side, these are the resources monitored to detect any RACH attempt. PRACH time-frequency resources are semi-statically allocated within the PUSCH region and repeat periodically. The exact PRACH configuration (i.e. the L1 aspects of RACH) is part of RadioResourceConfigCommonSIB, e.g. when it transitions from idle to connected, or in RadioResourceConfigCommon, when it is handed over to another cell. In both cases the UE contains the field prach-Config of IE PRACH-ConfigSIB or PRACH-Config.

Reception of a RAR (Random Access Response) message with a temporary C-RNTI (Cell Radio Network Temporary Identifier) is discussed with respect to Operation 2 of FIG. 6.

In Operation 2, upon sending the preamble, the UE starts to monitor the reception of a Random-Access Response (RAR) message. That message is transmitted in the Physical Downlink Shared CHannel (PDSCH) and scheduled in the Physical Downlink Control Channel (PDCCH).

To detect and decode the RAR, UE monitors the SpCell PDCCH identified by the RA-RNTI (e.g. instead of a C-RNTI, typically used for connected mode UEs to schedule data or control information on PDCCH/PDSCH). The exact RA-RNTI value used by the UE in this monitoring is known based on the selected preamble, as the RA-RNTI sent by the network unambiguously identifies which time-frequency resource was utilized by the MAC (Medium Access Control) entity to transmit the RACH preamble. Hence, before the monitoring the UE performs a specified mapping between its selected PRACH resource(s) where the preamble was transmitted and the RA-RNTI to be monitored in the RAR window to decode its RAR.

Hence, if multiple UEs had collided by selecting the same preamble in the same time-frequency resource, they would each receive the RAR with the same RA-RNTI (Random Access Radio Network Temporary Identifier). The RAR conveys the identity of the detected preamble, a timing alignment instruction to synchronize subsequent uplink transmissions from the UE, an initial uplink resource grant for transmission of the Step 3 message, and an assignment of a temporary Cell Radio Network Temporary Identifier (C-RNTI) (which may or may not be made permanent depending of the next step—contention resolution). The RAR message can also include a 'backoff indicator' which the eNodeB can set to instruct the UE to back off for some time before retrying a RACH attempt.

Elements of a MAC (Medium Access Control) RAR (Random Access Response) from Operation 2 of FIG. 5 are illustrated in FIG. 7.

If the timer related to the RAR time window expires before the UE receives the RAR, the UE applies the power raping before it retransmits a preamble. That is continued until the procedure succeeds or until a maximum number of attempts is reach (then a RACH failure is declared).

In operation 3, Message 3 is transmitted with UE-identity on RRC.

In operation 3, the UE sends the so-called MSG.3. That is the first scheduled uplink transmission on the PUSCH. It conveys the actual procedure message, such as an RRC connection request, RRC resume request, etc. It is addressed to the temporary C-RNTI allocated in the RAR at Step 2 and carries the C-RNTI or an initial UE identity. That message relies on HARQ (Hybrid Automatic Repeat Request) retransmissions.

In case of a preamble collision having occurred at Operation 1, the colliding UEs will receive the same temporary C-RNTI through the RAR and will also collide in the same uplink time-frequency resources when transmitting their MSG.3 (as they have received the same RAR). This may result in such interference that no colliding UE can be decoded, and the UEs restart the RACH procedure after reaching the maximum number of HARQ retransmissions, which may avoid the need of contention resolution (unless they select again the same preamble, which is unlikely).

However, if at least one UE is successfully decoded, the contention remains unresolved for the other UEs at this step. The MAC downlink message (in Operation 4) allows a quick resolution of this contention.

Contention resolution occurs at operation 4.

If for at least one of the UEs sending MSG.3 it was possible to detect its content, properly acknowledged by the network with HARQ, in the fourth operation, a contention resolution message is needed.

The contention resolution message also uses HARQ. It is addressed to the C-RNTI (if indicated in the MSG.3 message) or to the temporary C-RNTI (t-C-RNTI). In the latter case, the message echoes the UE identity contained in the RRC message (e.g. resume identifier, s-TMSI, etc.). The reason to distinguish these two cases is that if the UE is performing RACH during handover with CBRA, the target cell will allocate a C-RNTI in the handover command (prepared by target) which should have been an unique C-RNTI. Hence, as an indication that target detected the MSG.3 (in this example a RRCConfigurationComplete message), the MSG4 is sent to the same C-RNTI. The assumption is that the C-RNTI allocated by target is unique and there is no source of confusion i.e. if another UE receives that message 4 with a C-RNTI that is not yours, it knows collision has happened.

In the other case, when the UE does not have a C-RNTI allocated by the target, MSG.4 uses the temporary C-RNTI. And, in case that may go to different UEs, so network needs to indicate for which UE MSG.3 has been decoded and for which UE network wants to indicate that contention was resolved. That is done by the echoing back of the UE identifier in the RRC message (e.g. resume identifier, S-TMSI, etc.), which is very unlikely to also be the same.

In case of a collision followed by successful decoding of the MSG.3, the HARQ feedback is transmitted only by the UE which detects its own UE identity (or C-RNTI); other UEs understand there was a collision, transmit no HARQ feedback, and can quickly exit the current RACH procedure and start another one. The UE's actions upon reception of the contention resolution message therefore has three possibilities: The UE correctly decodes the message and detects its own identity: it sends back a positive ACKnowledgement, 'ACK'; The UE correctly decodes the message and discovers that it contains another UE's identity (contention resolution): it sends nothing back (Discontinuous Transmission, 'DTX'); and The UE fails to decode the message or misses the DL grant: it sends nothing back ('DTX').

Below an example is shown where two UEs could be trying to perform a transition from idle to connected when collision happens. Preamble collision is illustrated in FIG. 8.

What happens after contention is detected is discussed below.

As described above, if the UE receives in MSG.4 its C-RNTI allocated by target, or its temporary C-NRTI+its UE identifier transmitted in MSG.3, the UE considers the contention resolution as successful. Else, if the contention resolution timer expires or if the UE receives MSG.4 with its temporary C-RNTI but a different UE identifier, UE considers contention resolution failed and re-initiates random access procedure. Notice that as the next attempt may succeed, it is not visible to the network that a collision has occurred. Hence, the indication in the RACH report is actually the UE detection of a collision via detecting MSG.4 content not addressed to itself.

The contention detection and contention resolution process in LTE is described in 3GPP TS 36.321 V15.7.0 (2019-09), also referred to as Reference [2]. Random Access Procedure initialization is discussed in Section 5.1.1 and Contention Resolution is discussed in Section 5.1.5 of Reference [2].

As in LTE, random access procedure is described in the NR MAC specifications and parameters are configured by RRC e.g. in system information or handover (RRCReconfiguration with reconfigurationWithSync). Random access is triggered in many different scenarios, for example, when the UE is in RRC_IDLE or RRC_INACTIVE and want to access a cell that is camping on (i.e. transition to RRC_CONNECTED).

In NR, RACH configuration is broadcasted in SIB1, as part of the servingCellConfigCommon (with both DL and UL configurations), where the RACH configuration is within the uplinkConfigCommon. The exact RACH parameters are within what is called initialUplinkBWP, since this is the part of the UL (Uplink) frequency the UE shall access and search for RACH resources.

In LTE, the RACH report to assist the network to perform RACH optimization, contains an indication that collision was detected. With that information it is clear that at some point before that RACH procedure that has succeeded that same UE tried to access the network and happened to have a collision.

In NR, a mechanism also exists for contention resolution for contention-based random access. In NR, random access resource selection needs to be performed within a cell depending on measurements performed on SSBs (synchronization signal blocks) or CSI-RSs (Channel State Information Reference Signals). A cell in NR is basically defined by a set of these SSBs that may be transmitted in 1 downlink beam as shown in FIG. 9A (typical implementation for lower frequencies e.g. below 6 GHz) or multiple downlink beams as shown in FIG. 9B (typical implementation for lower frequencies e.g. below 6 GHz). For the same cell, these SSBs carry the same physical cell identifier (PCI) and a MIB. For standalone operation, i.e., to support UEs camping on an NR cell, they also carry in SIB1 the RACH configuration, which comprises a mapping between the detected SSB covering the UE at a given point in time and the PRACH configuration (e.g. time, frequency, preamble, etc.) to be used. For that, each of these beams may transmit its own SSB which may be distinguished by an SSB index.

The mapping between RACH resources and SSBs (or CSI-RS) is also provided as part of the RACH configuration (in RACH-ConfigCommon). Two parameters relevant here include: #SSBs-per-PRACH-occasion: ⅛, ¼, ½, 1, 2, 8 or 16, which represents the number of SSBs per RACH occasion; and #CB-preambles-per-SSB preambles to each SS-block: within a RACH occasion, how many preambles are allocated;

To give a first example as shown in FIG. 10, if the number of SSBs per RACH occasion is 1, and if the UE is under the coverage of a specific SSB e.g. SSB index 2, there will be a RACH occasion for that SSB index 2. If the UE moves and is now under the coverage of another specific SSB e.g. SSB index 5, there will be another RACH occasion for that SSB index 5 i.e. each SSB detected by a given UE would have its own RACH occasion. Hence, at the network side, upon detecting a preamble in a particular RACH occasion the network knows exactly which SSB the UE has selected and, consequently, which downlink beam is covering the UE, so that the network can continue the downlink transmission e.g. RAR, etc. That factor 1 is an indication that each SSB has its own RACH resource. i.e., a preamble detected there indicates to the network which SSB the UE has selected, i.e. which DL (Downlink) beam the network should use to communicate with the UE, such as the one to send the RAR.

Note that each SS-block typically maps to multiple preambles (different cyclic shifts and Zadoff-Chu roots) within a PRACH occasion, so that it is possible to multiple different UEs in the same RACH occasions since they may be under the coverage of the same SSB. In a second example, shown in FIG. 11, the number of SSBs per RACH occasion is 2.

Hence, a preamble received in that RACH occasion indicated to the network that one of the two beams are being selected by the UE. So either the network has means via implementation to distinguish these two beams and/or should perform a beam sweeping in the downlink by transmitting the RAR in both beams, either simultaneously or, transmitting in one, waiting for a response from the UE, and if absent, transmit in the other.

Assuming now that in the first attempt the UE has selected an SSB (based on measurements performed in that cell), transmitted with initial power a selected preamble associated to the PRACH resource mapped to the selected SSB, and has not received a RAR within the RAR time window. According to the specifications, the UE may still perform preamble re-transmission (i.e. maximum number of allowed transmissions not reached).

Differences in contention resolution in NR and LTE are discussed below.

As discussed above regarding contention based random access in LTE, in LTE collisions may occur in a cell because multiple UEs have selected the same RACH preamble and, consequently could have transmitted in the same time/frequency PRACH resource transmission. In NR, collisions occur when multiple UEs select the same preamble associated to the beam (i.e. UEs may have to select the same SSB and CSI-RS), otherwise the timer/frequency RACH resource would be different, as there may be different mapping between beams and RACH resources.

The contention resolution process in NR is quite similar to the one in LTE, described Section 5.1.5 of Reference [2]. If multiple UEs under the coverage of the same downlink beam select the same preamble, they will also monitor PDCCH (Physical Downlink Control Channel) using the same RA-RNTI and receive the same RAR content, including the same UL grant for MSG.3 transmission (among other things, e.g., timing advance, etc.). If both send that, and if the network is able to decode at least one of them, a contention resolution exists (MSG.4) so the UE knows that contention is resolved. As in LTE, that MSG.4 addresses the UE either using a C-RNTI (if one was allocated by the target, e.g. in case of handovers or in case the UE is in RRC_CONNECTED), or a TC-RNTI (temporary C-RNTI), in case this is an incoming UE e.g. from a state transition. And, as in LTE, in case the network addresses the UE with a TC-RNTI, it also includes in the MAC payload the UE identity used in MSG.3, e.g., resume identifier.

Then, thanks to that mechanism the UE detecting this contention resolution message is able to detect if collision has occurred and, if it needs to re-start RACH again. That is done by analyzing the contention of the message or upon the expiry of the contention resolution timer.

If the content of the MSG.4 has the UE's TC-RNTI (Temporary Cell Radio Network Temporary Identifier) assigned in MSG.2, and the contention resolution identity in the payload matches its identifier sent in MSG.3, the UE considers contention resolved and is not even aware that there was any collision. If it has its TC-RNTI and the contention resolution identity in the payload does not match its identifier sent in MSG.3, UE declares a collision and performs further actions, such as declaring RACH failure or performing another RACH attempt.

In summary, contention may be unresolved and collision detected in two cases: MSG.4 addressing TC-RNTI and UE Identities do not match; and contention resolution timer expires.

If we make an analogy with the existing LTE solution for RACH optimization, the UE would log the occurrence of that event upon these cases.

The contention resolution in NR is shown below as described in the MAC specifications (3GPP TS 38.321 V15.7.0 (2019-09)), also referred to as Reference [3].

Assuming that in the first attempt the UE has selected an SSB (based on measurements performed in that cell), it has transmitted with initial power a selected preamble associated to the PRACH resource mapped to the selected SSB, and it has not received a RAR within the RAR time window. According to the specifications, the UE may still perform preamble re-transmission (i.e. maximum number of allowed transmissions not reached).

As in LTE, at every preamble retransmission attempt, the UE may assume the same SSB as the previous attempt and perform power ramping similar to LTE. A maximum number of attempts is also defined in NR, which is also controlled by the parameter PREAMBLE_TRANSMISSION_COUNTER.

On the other hand, different from LTE, at every preamble retransmission attempt, the UE may alternatively select a different SSB, as long as that new SSB has an acceptable quality (i.e. its measurements are above a configurable threshold). In that case, when a new SSB (or, in more general term, a new beam) is selected, the UE does not perform power ramping, but transmits the preamble with the same previously transmitted power (i.e. UE shall not re-initiate the power to the initial power transmission). This is shown in FIGS. 12A, 12B, and 12C.

As shown in FIG. 12A, at time t0, the UE selects SSB63 using preamble power P0, and RAR is NOT received. As shown in FIG. 12B, at time t1, the UE selects SSB63 again using preamble power P1 equal to P0 plus offset, and RAR is not received. As shown in FIG. 12C, at time t2, the UE selects SSB 64 using preamble power P1 equal to P0 plus offset, and RAR is received.

For that reason, a new variable is defined in the NR MAC specifications (Reference [3]) called PREAMBLE_POWER_RAMPING_COUNTER, in case the same beam is selected at a retransmission. At the same time, the previous LTE variable still exists (PREAMBLE_TRANSMISSION_COUNTER), so that the total number of attempts is still limited, regardless if the UE performs at each attempt SSB/beam re-selection or power ramping.

Hence, if the initial preamble transmission, e.g. associated to SSB-2, does not succeed, and the UE selects the same SSB/beam, PREAMBLE_POWER_RAMPING_COUNTER is incremented (i.e. set to 2 in this second attempt) and the transmission power will be:

PREAMBLE_RECEIVED_TARGET_POWER=preambleReceivedTargetPower+DELTA_PREAMBLE+1*PREAMBLE_POWER_RAMPING_STEP;

Else, if instead the UE selects a different SSB/beam, the PREAMBLE_POWER_RAMPING_COUNTER is not incremented (i.e. remains 1) and the transmission power will be as in the first transmission:

PREAMBLE_RECEIVED_TARGET_POWER=preambleReceivedTargetPower+DELTA_PREAMBLE;

That preamble power ramping procedure, in case of multiple preamble transmission attempts, is further described in the NR MAC specifications (Reference [3]). Random Access procedure initialization is discussed in Section 5.1.1, Random Access Resource selection is discussed in Section 5.1.2, Random Access Preamble transmission is discussed in Section 5.1.3 and Random Access Response reception is discussed in Section 5.1.4 of Reference [3].

In LTE, the UE may be configured to perform CFRA e.g. during handovers. That configuration goes in the mobilityControlInfo field of MobilityControlInfo IE, as shown in Table 2 for the MobilityControlInfo information element.

TABLE 2

```
-- ASN1START
MobilityControlInfo ::=        SEQUENCE {
    targetPhysCellId              PhysCellId,
    carrierFreq                   CarrierFreqEUTRA           OPTIONAL,
    -- Cond HO-toEUTRA2
    carrierBandwidth              CarrierBandwidthEUTRA      OPTIONAL,
    -- Cond HO-toEUTRA
    additionalSpectrumEmission      OPTIONAL,  -- Cond HO-toEUTRA
    t304                          ENUMERATED {
                                      ms50, ms100, ms150, ms200, ms500,
ms1000,
                                      ms2000, ms10000-v1310},
    newUE-Identity                C-RNTI,
    radioResourceConfigCommon     RadioResourceConfigCommon,
    rach-ConfigDedicated          RACH-ConfigDedicated       OPTIONAL,
    -- Need OP
// remaining parts omitted
```

And RACH-ConfigDedicated is defined as shown in Table 3 for the RACH-ConfigDedicated information element.

TABLE 3

```
-- ASN1START
RACH-ConfigDedicated ::=  SEQUENCE {
    ra-PreambleIndex            INTEGER (0..63),
    ra-PRACH-MaskIndex          INTEGER (0..15)
}
-- ASN1STOP
```

RACH-ConfigDedicated field descriptions ra-PRACH-MaskIndex
Explicitly signalled PRACH Mask Index for RA Resource selection in TS 36.321 [6].
ra-PreambleIndex
Explicitly signalled Random Access Preamble for RA Resource selection in TS 36.321 [6].

If the field rach-ConfigDedicated is absent, the UE applies contention based random access as specified in TS 36.321, also referred to as Reference [2]. Otherwise the UE performs CFRA as discussed below with respect to Sections 5.1.2, 5.1.3, and 5.1.4 of Reference [2]. Random Access Resource selection is discussed in Section 5.1.2, Random Access Preamble transmission is discussed in Section 5.1.3 and Random Access Response reception is discussed in Section 5.1.4 of Reference [2].

When the UE receives a CFRA configuration, it performs preamble transmissions and, if RAR is not received within the RAR time window the UE is allowed to perform power ramping and preamble retransmission, by selecting the same configured dedicated preamble. Notice that from a MAC perspective, this is valid until the UE reaches the maximum number of RACH attempt, where a failure is declared if that happens. From an RRC perspective, for example, if that dedicated RACH configuration is provided during handovers in mobility Control Info, the UE is allowed to do that until the failure timer T304 is running (started when UE receives the handover command i.e. the RRC Connection Reconfiguration). This is discussed in Sections 5.3.5.4 and 5.3.5.6 of TS 36.331 (Reference [1]). Reception of an RRCConnectionReconfiguration including the mobilityControlInfo by the UE (handover) is discussed in Section 5.3.5.4 and T304 expiry (handover failure) is discussed in Section 5.3.5.6 of Reference [1].

In NR, as in LTE, the UE may be configured to perform CFRA e.g. during handovers. That configuration goes in the reconfigurationWithSync of IE ReconfigurationWithSync (which goes in the CellGroupConfig IE, transmitted in the RRCReconfiguration message), as shown in Table 4.

TABLE 4

```
ReconfigurationWithSync ::=     SEQUENCE {
    spCellConfigCommon              ServingCellConfigCommon
    OPTIONAL,  -- Need M
    newUE-Identity                  RNTI-Value,
    t304                            ENUMERATED {ms50, ms100,
                                        ms150, ms200,
    ms500, ms1000, ms2000, ms10000},
    rach-ConfigDedicated            CHOICE {
        uplink                          RACH-ConfigDedicated,
        supplementaryUplink             RACH-ConfigDedicated
    }
OPTIONAL,  -- Need N
    ...,
    [[
    smtc                            SSB-MTC
OPTIONAL  -- Need S
    ]]
}
```

The RACH-ConfigDedicated information element is illustrated in Table 5.

TABLE 5

```
-- ASN1START
-- TAG-RACH-CONFIG-DEDICATED-START
RACH-ConfigDedicated ::=      SEQUENCE {
    cfra                            CFRA OPTIONAL, -- Need S
    ra-Prioritization                                          OPTIONAL,
```

TABLE 5-continued

```
-- Need N
   ...
}
CFRA ::=                            SEQUENCE {
   occasions                           SEQUENCE {
      rach-ConfigGeneric                  ,
      ssb-perRACH-Occasion                ENUMERATED {oneEighth, oneFourth, oneHalf, one,
two, four, eight, sixteen}             OPTIONAL -- Cond SSB-CFRA
   }
OPTIONAL, -- Need S
   resources                           CHOICE {
      ssb                                 SEQUENCE {
         ssb-ResourceList                    SEQUENCE (SIZE(1..maxRA-SSB-Resources))
OF CFRA-SSB-Resource,
         ra-ssb-OccasionMaskIndex            INTEGER (0..15)
      },
      csirs                               SEQUENCE {
         csirs-ResourceList                  SEQUENCE (SIZE(1..maxRA-CSIRS-
Resources)) OF CFRA-CSIRS-Resource,
         rsrp-ThresholdCSI-RS                RSRP-Range
      }
   },
   ...,
   [[
   totalNumberOfRA-Preambles-v1530 INTEGER (1..63)             OPTIONAL
-- Cond Occasions
   ]]
}
CFRA-SSB-Resource ::=              SEQUENCE {
   ssb                                 SSB-Index,
   ra-PreambleIndex                    INTEGER (0..63),
   ...
}
CFRA-CSIRS-Resource ::=            SEQUENCE {
   csi-RS                              CSI-RS-Index,
   ra-OccasionList                     SEQUENCE (SIZE(1..maxRA-OccasionsPerCSIRS)) OF
INTEGER (0..maxRA-Occasions-1),
   ra-PreambleIndex                    INTEGER (0..63),
   ...
}
-- TAG-RACH-CONFIG-DEDICATED-STOP
-- ASN1STOP
```

One first difference between NR and LTE shown above, that is also discussed in connection with FIGS. 9A and 9B, is that RACH resources may be mapped to beams (e.g. SSBs or CSI-RS resources that may be measured by the UE). Hence, when CFRA resources are provided they are also mapped to beams and there may be done only for a subset of beams in a given target cell.

The consequence is that to use CI-RA resources the UE needs to select a beam for which it has CFRA resources configured in the dedicated configuration. In the case of SSBs, for example, that may be found in the ssb-ResourceList which is a SEQUENCE (SIZE(1.maxRA-SSB-Resources)) OF CFRA-SSB-Resource.

If we would make an analogy with LTE, i.e., if the NR solution would have been the same as LTE, upon selecting a beam with CFRA resource (e.g. a beam from the configured list) and not receiving the RAR, the UE would keep selecting the same resource and ramp the power before retransmitting the preamble. However, as in the case of NR CBRA, the UE has the option upon every failed attempt to select another beam. And, that another beam may either be in the list of beams for CFRA or it may not. In the case the selected beam is not, the UE performs CBRA.

Also notice that there is a fallback between CSI-RS selection to SSB selection, in case CFRA is provided for CSI-RS resources.

This is captured in Section 5.1.2 of the NR MAC specification 3GPP TS 38.321 (Reference [3]).

As part of the RAN2 107 #45 email discussion, several details of the RACH reports were discussed. One of such details is associated to when the RACH report shall be triggered by the UE and the responses of the companies and the conclusion from the email discussion rapporteur is given below.

The email discussion included Question 1-7: Which RACH scenario should be applicable for RACH Report?

Based on the responses from the different companies the email discussion rapporteur made the following proposals:

Proposal 1-8: At least the following RACH scenarios are applicable for RACH report:
Initial access from RRC_IDLE;
RRC Connection Re-establishment procedure;
Handover;
Request by RRC upon synchronous reconfiguration;
Transition from RRC_INACTIVE;
FFS (For Further/Future Study): whether 'Beam failure recovery' and 'Request for Other SI' RACH scenarios are also applicable for RACH report or not is for further study (FFS).

The email discussion further included Question 1-8: Do companies think the issue that one successful RACH Report triggered by RACH scenario A may cover by another successful RACH Report triggered by RACH scenario B should be identified or not?

Ericsson responded YES and made further comments that there are benefits from having a list of RACH report which includes all (up to a maximum number) RACH attempts regarding which the network has not been notified of the RACH report availability. For example, a UE that performs three BFR procedure can include these three BFR related RACH information in a single RACH report and inform the same to the RRC when the next RRCReconfigurationComplete or RRCReestablishmentComplete or RRCResumeComplete or RRCSetupComplete message is sent.

Based on the responses from the different companies the email discussion rapporteur made the following conclusion and proposals:

For Questions1-8, based on the feedback from companies, the following conclusions have been made: 5 companies (Ericsson/Huawei/CMCC/Nokia/CATT) think a list of RACH report is acceptable; and 1 company thinks it depends on the outcome of proposal 1-8.

Proposal 1-9: Whether a list of RACH report is needed or not may depend on the outcome of proposal 1-8.

Notwithstanding known methods of RACH reporting, there continues to exist a need for methods provided improved efficiency.

SUMMARY

According to some embodiments of inventive concepts, a method is provided to operate a wireless device providing communication with a wireless network. The wireless device registers with a first Public Land Mobile Network, PLMN, having a first PLMN identity. A first plurality of Random Access, RA, procedures are performed while registered with the first PLMN. First information is stored in memory where the first information is related to the first plurality of RA procedures associated with the first PLMN having the first PLMN Identity. The wireless device registers with a second PLMN having a second PLMN identity different than the first PLMN identity after registering with the first PLMN and after performing the first plurality of RA procedures. The first information is discarded from the memory responsive to registering with the second PLMN. A second plurality of RA procedures are performed while registered with the second PLMN. Second information is stored in the memory where the second information is related to the second plurality of RA procedures associated with the second PLMN having the second PLMN Identity. An information message is transmitted to the second PLMN, where the information message includes a plurality of RACH reports corresponding to the second plurality of RA procedures associated with the second PLMN identity based on the second information.

According to some other embodiments of inventive concepts, a wireless device includes processing circuitry and memory coupled with the processing circuitry. The memory includes instructions that when executed by the processing circuitry causes the wireless device to: register with a first Public Land Mobile Network, PLMN, having a first PLMN identity; perform a first plurality of Random Access, RA, procedures while registered with the first PLMN; store, in memory, first information related to the first plurality of RA procedures associated with the first PLMN having the first PLMN Identity; register with a second PLMN having a second PLMN identity different than the first PLMN identity after registering with the first PLMN and after performing the first plurality of RA procedures; discard the first information from the memory responsive to registering with the second PLMN; perform a second plurality of RA procedures while registered with the second PLMN; store, in the memory, second information related to the second plurality of RA procedures associated with the second PLMN having the second PLMN Identity; and transmit an information message to the second PLMN, wherein the information message includes a plurality of RACH reports corresponding to the second plurality of RA procedures associated with the second PLMN identity based on the second information.

According to still other embodiments of inventive concepts, a wireless device is adapted to: register with a first Public Land Mobile Network, PLMN, having a first PLMN identity; perform a first plurality of Random Access, RA, procedures while registered with the first PLMN; store, in memory, first information related to the first plurality of RA procedures associated with the first PLMN having the first PLMN Identity; register with a second PLMN having a second PLMN identity different than the first PLMN identity after registering with the first PLMN and after performing the first plurality of RA procedures; discard the first information from the memory responsive to registering with the second PLMN; perform a second plurality of RA procedures while registered with the second PLMN; store, in the memory, second information related to the second plurality of RA procedures associated with the second PLMN having the second PLMN Identity; and transmit an information message to the second PLMN, wherein the information message includes a plurality of RACH reports corresponding to the second plurality of RA procedures associated with the second PLMN identity based on the second information.

According to some embodiments of inventive concepts, efficiency of RACH reporting and/or radio resource utilization may be improved by providing RACH reports relating to the PLMN with which the wireless device is currently registered (without providing RACH reports for a previous PLMN). Moreover, by discarding information related to RA procedures associated with a prior PLMN from wireless device memory, an efficiency of memory utilization may be improved according to some embodiments.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 10 and 11 are diagrams illustrating synchronization signal blocks and RACH occasion;

FIGS. 12A, 12B, and 12C are diagrams illustrating a cell in NR transmitting in multiple downlink beams to a UE;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
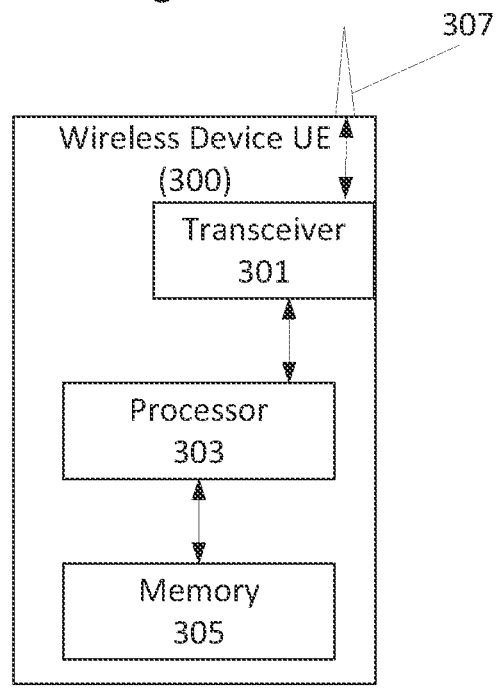
FIG. 1 is a block diagram illustrating a wireless device UE according to some embodiments of inventive concepts.

FIG. 1 is a block diagram illustrating elements of a wireless device UE 300 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 300 may be provided, for example, as discussed below with respect to wireless device QQ110 of FIG. 17.) As shown, wireless device UE may include an antenna 307 (e.g., corresponding to antenna QQ111 of FIG. 17), and transceiver circuitry 301 (also referred to as a transceiver, e.g., corresponding to interface QQ114 of FIG. 17) including a transmitter and a receiver configured to provide uplink and downlink radio communications with a base station(s) (e.g., corresponding to network node QQ160 of FIG. 17, also referred to as a RAN node) of a radio access network. Wireless device UE may also include processing circuitry 303 (also referred to as a processor, e.g., corresponding to processing circuitry QQ120 of FIG. 17) coupled to the transceiver circuitry, and memory circuitry 305 (also referred to as memory, e.g., corresponding to device readable medium QQ130 of FIG. 17) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 2:
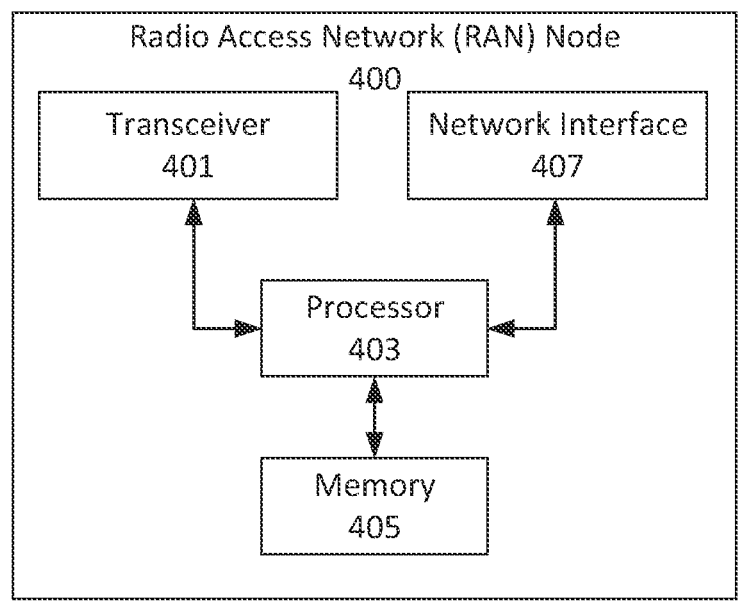
FIG. 2 is a block diagram illustrating a radio access network RAN node (e.g., a base station eNB/gNB) according to some embodiments of inventive concepts.

FIG. 2 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node QQ160 of FIG. 17.) As shown, the RAN node may include transceiver circuitry 401 (also referred to as a transceiver, e.g., corresponding to portions of interface QQ190 of FIG. 17) including a transmitter and a receiver configured to provide uplink and downlink radio communications with mobile terminals. The RAN node may include network interface circuitry 407 (also referred to as a network interface, e.g., corresponding to portions of interface QQ190 of FIG. 17) configured to provide communications with other nodes (e.g., with other base stations) of the RAN and/or core network CN. The network node may also include processing circuitry 403 (also referred to as a processor, e.g., corresponding to processing circuitry QQ170) coupled to the transceiver circuitry, and memory circuitry 405 (also referred to as memory, e.g., corresponding to device readable medium QQ180 of FIG. 17) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 3:
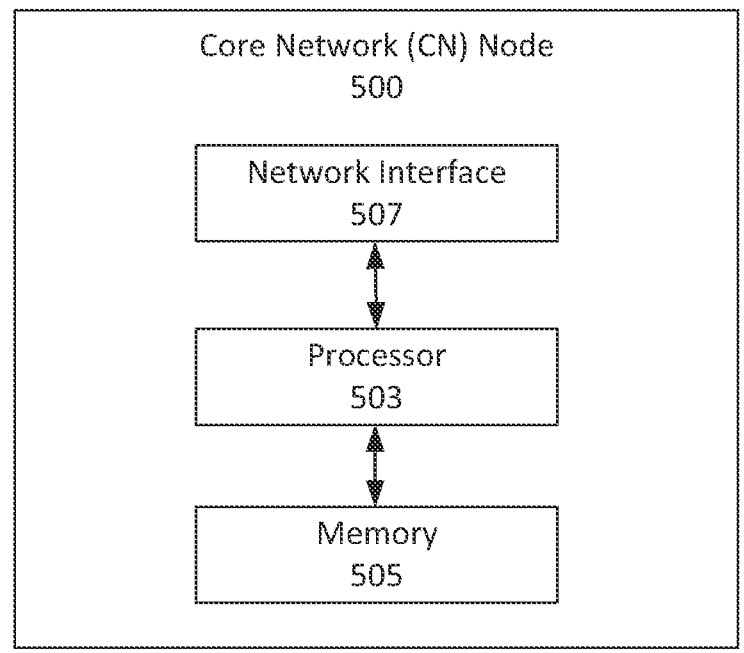
FIG. 3 is a block diagram illustrating a core network CN node (e.g., an AMF node, an SMF node, etc.) according to some embodiments of inventive concepts.
Figure 4:
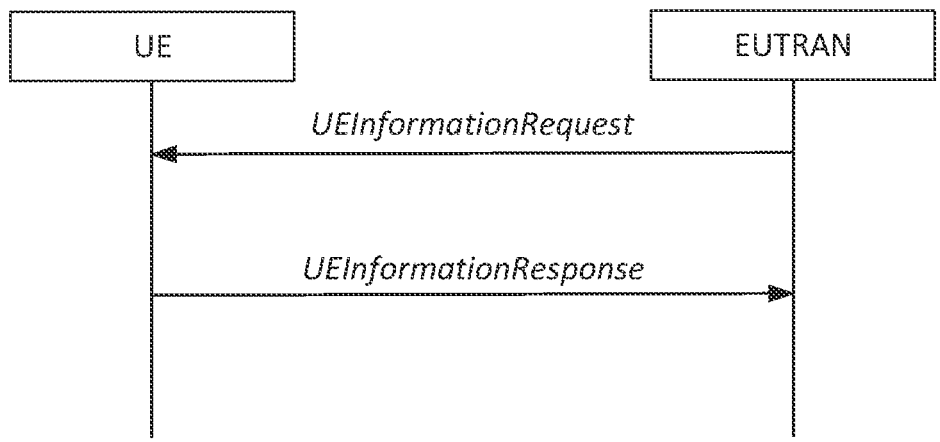
FIG. 4 is a message diagram illustrating a UE information procedure.
Figure 5:
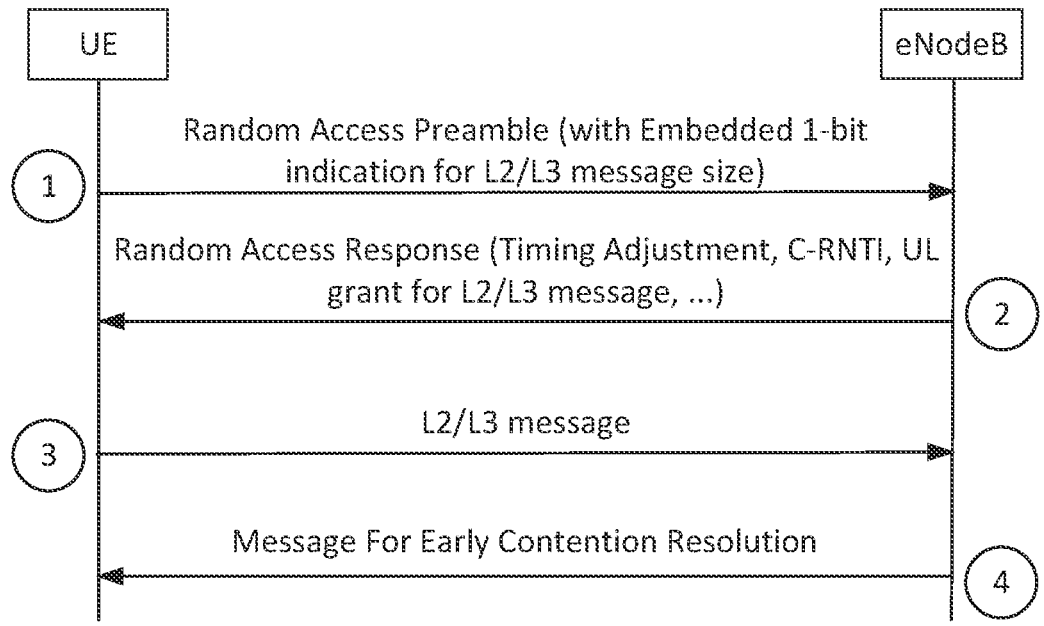
FIG. 5 is a message diagram illustrating contention based random access CBRA.
Figure 6:
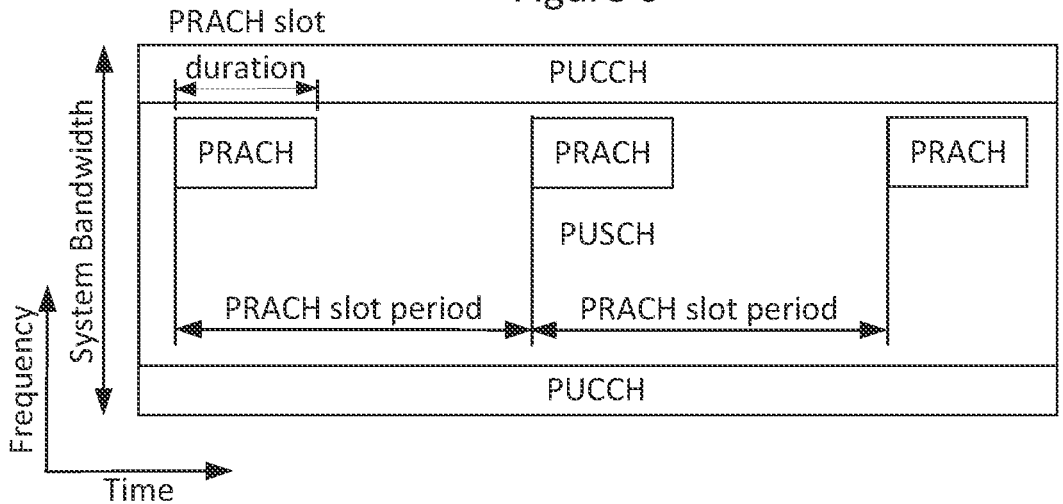
FIG. 6 is an illustration of a Layer 1 perspective of a preamble that is transmitted in the so-called Physical Random-Access Channel.
Figure 7:
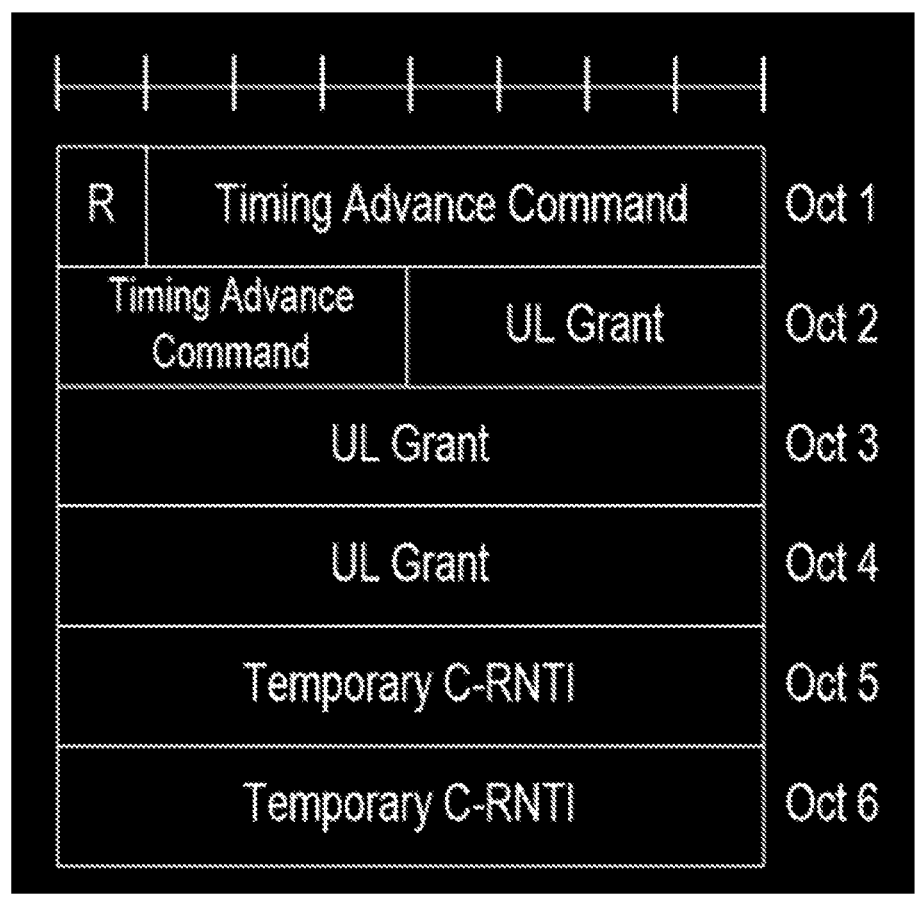
FIG. 7 is an illustration of elements of a Medium Access Control Random Access Response from Operation 2 of FIG. 5.

FIG. 3 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes).

In the existing agreements, companies have mentioned that the list of RACH report can be sent from the UE. This is to enable the UE to inform the network about RACH report for all the possible RACH accesses to the CU-CP. In the existing methods, CU is unaware of the RACH accesses associated to some of RACH procedure related to serving cell like beam failure recovery.

There are two open issues associated to this. The first issue is whether the RACH report associated to one cell can be sent to another cell or not? The second issue is how the CU-CP gets to know about the RACH accesses that is thus far invisible to it?

Three independent methods are proposed according to some embodiments of inventive concepts.

Method-1: Based on a message including a list of RACH reports containing the information about a number of RACH procedures performed by the UE.

Method-2: Based on an explicit indication from the UE to the RRC about the availability of the RACH report after every time the UE performs a RACH procedure.

Method-2a: Based on the explicit signaling from UE's MAC entity to UE's RRC layer, indicating the beam indexes as well as the time stamps the UE has performed RACH over the selected beams.

Method-3: Based on the gNB-DU (gNB Distributed Unit) sending an explicit indication to the CU-CP (Central Unit Control Plane) about the successful random-access procedure performed by the UE so that the CU-CP can request the UE to send the associated RACH report.

Based on the methods proposed in embodiments of the present disclosure, the network can learn about the RACH related issues much faster as more RACH reports can be collected from the UE.

The method-1 has the advantage that RRC messages carrying RACH reports can each carry a plurality of RACH reports which is more efficient than RRC messages carrying a single RACH report each. This method also reduces communication overhead between gNB-DU and CU-CP.

The method-2 has the advantage that this method also reduces communication overhead between gNB-DU and CU-CP. This method also ensures that the UE does not need to increase its memory reservation for RACH report as the UE is expected to keep the information about only its latest random access procedure in this method.

The method-2a allows the RRC layer to collect the layer 3 measurements of the beams that MAC entity has used to perform the RACH attempts.

The method-3 ensures that the UE does not need to increase its memory reservation for RACH report as the UE is expected to keep the information about only its latest random access procedure in this method.

Detailed embodiments of method-1 are discussed below.

In this method the UE stores information related to a plurality of random-access procedures in a RACH report list and provides the RACH report list to the network using RRC communication with the network.

In one embodiment of the invention, the UE is allowed to store only the random-access related information towards a particular cell and the UE indicates the availability of such a report only to that cell i.e., the RACH report as such does not contain the cell ID (identifier) and the UE flushes this information if the UE does not make any communication with the RRC using which it can inform the availability of such a RACH report. An example of this RACH report might be provided as shown by the ASN.1 code given in Table 6.

TABLE 6

| | |
|---|---|
| UEInformationResponse ::= | SEQUENCE { |
| rach-ReportList | OPTIONAL |
| } | |
| RACH-ReportList ::= | SEQUENCE (SIZE (1..maxRACHReport)) OF |
| RACH-Report | |
| RACH-Report ::= | SEQUENCE { |
| numberOfPreamblesSent | NumberOfPreamblesSent, |
| contentionDetected | BOOLEAN |
| .. (there could be other parameters here in NR) | |
| } | |
| | OPTIONAL, |

In order to ensure that the serving cell has the maximum possibility to extract this information from the UE (and avoid the flushing of such info during handover), the UE could indicate the presence of an existing RACH report in additional RRC messages like MeasurementReport (a flag that tells the RRC of the available RACH report). The MeasurementReport message is illustrated in Table 7.

TABLE 7

| | |
|---|---|
| -- | ASN1START |
| -- | TAG-MEASUREMENTREPORT-START |
| MeasurementReport ::= | SEQUENCE { |
| criticalExtensions | CHOICE { |
| measurementReport | MeasurementReport-IEs, |
| criticalExtensionsFuture | SEQUENCE { } |
| } | |
| } | |
| MeasurementReport-IEs ::= | SEQUENCE { |
| measResults | MeasResults, |
| rach-InfoAvailable | ENUMERATED {true} |
| OPTIONAL, | |
| lateNonCriticalExtension | OCTET STRING |
| OPTIONAL, | |
| nonCriticalExtension | SEQUENCE{ } |
| OPTIONAL | |
| } | |
| -- | TAG-MEASUREMENTREPORT-STOP |
| -- | ASN1STOP |

In another embodiment of the invention, the UE stores the cell-ID associated to each of the random-access procedure as the RACH report relating to the performed random access procedure can be sent to any cell towards which the UE performs RRC communication. An example of how this RACH report might look like in the ASN.1 code is given in Table 8.

TABLE 8

| | | |
|---|---|---|
| UEInformationResponse ::= | SEQUENCE { | |
| rach-ReportList | RACH-ReportList | OPTIONAL |
| } | | |
| RACH-ReportList ::= | SEQUENCE (SIZE (1..maxRACHReport)) OF | |
| RACH-Report | | |
| RACH-Report ::= | SEQUENCE { | |
| cellIdLocal | PhysCellId, | |
| cellIDGlobal | CellIdentity, | |
| numberOfPreamblesSent | NumberOfPreamblesSent, | |
| contentionDetected | BOOLEAN | |
| .. (there could be other parameters here in NR) | | |
| } | | |
| | OPTIONAL, | |

By storing the cell-ID associated to the performed random-access procedure, the UE can aggregate RACH reports relating to operations in different cells and include all of the aggregated RACH reports for different cells in one RACH Report list included in one message sent to the network allowing the receiving network node to recognize which cells, and associated network nodes, the individual RACH reports relate to and distribute the information in the individual RACH reports to relevant network nodes. This embodiment allows the UE to continue aggregating RACH reports also when performing handover to a new cell. This embodiment also enables reduced communication overhead by allowing a single RRC message to include RACH reports relating to operations in different cells.

In some sub-embodiments, the UE includes only the local or the global ID of the cell and in some other sub-embodiments, the UE includes both. The cell which receives the RACH report from the UE identifies that the report contains RACH information related to other cells (via the local and/or global cell id) and it then forwards such contents of the RACH report to the respective cell via X2/Xn interface.

The specification 3GPP TS 38.423 describing RACH report signaling over Xn interface can e.g. be updated as follows according to this embodiment:

The purpose of the RACH Indication procedure is to transfer between NG-RAN nodes the information regarding the performed RACH on a cell belonging to an NG-RAN node indicated in a RACH report solicited from a UE. The signalling takes place from the NG-RAN node at which a RACH Report is received, to an NG-RAN node to which the UE concerned may have previously been performed a RACH on a cell belonging to that NG-RAN node. This may aid the detection of issues related to the RACH procedure and enhance the performance of the RACH procedure.

Figure 13:
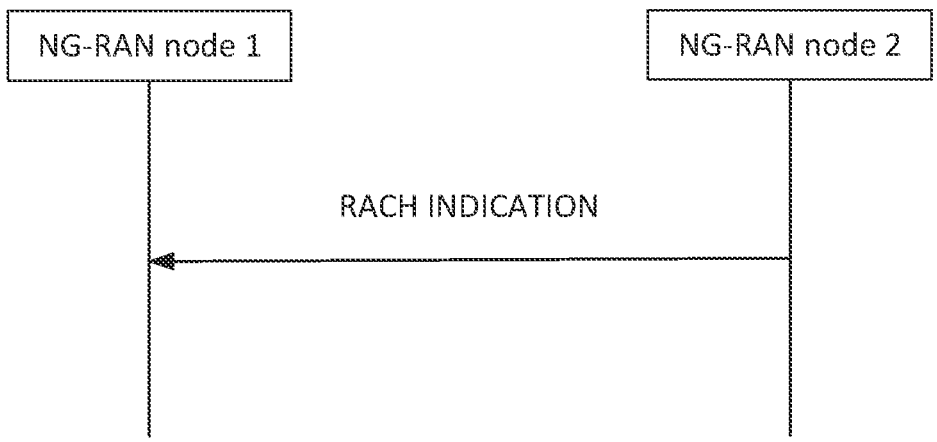
FIG. 13 is an illustration of a RACH Report Indication, according to some embodiments of inventive concepts.

The procedure uses non UE-associated signalling as illustrated in FIG. 13 which illustrates RACH Report Indication, successful operation.

NG-RAN node$_2$ initiates the procedure by sending the RACH INDICATION message to NG-RAN nodes following a reception of a RACH Report from a UE at NG-RAN node$_2$, when NG-RAN node$_2$ considers that the UE may have previously performed a RACH at a cell controlled by NG-RAN nodes.

PLMN (Public Land Mobile Network) Identity related embodiments are discussed below.

In yet another embodiment the UE includes the PLMN-Identity beside the Cell ID when collecting the RACH report. Hence, the UE would be able to report the RACH related information to the network when the Registered PLMN is equal to the PLMN-identity logged by UE when RACH has been performed. In yet another embodiment, the UE can create list of RACH reports per PLMN identity, so that when the UE moves to an area with a different PLMN identity it creates a new list of RACH reports associated with the new PLMN identity.

In yet another embodiment, when the UE is reporting the availability of the RACH report, it checks whether the registered PLMN in the serving cell is the same as the PLMN-identity logged as part of the RACH report (or logged beside the RACH report as part of VarRACHReport).

RACH Reports may be performed when the UE moves across cells with different PLMN Identity.

When the UE moves across cells with different PLMNs (while logging the RACH reports in a list of RACH reports), the following actions can be taken by the UE:

In some embodiments, when the UE enters a cell with a different PLMN identity, the UE can discard the collected RACH reports related to the RACH procedures performed over the cells with the first PLMN, and only collect the RACH reports related to the RACH procedures performed over the cells with the second PLMN identity.

In other embodiments, the UE can keep the list of the RACH reports related to the first PLMN identity and create a new list of RACH reports for the RACH procedures performed over the cells belonging to the second PLMN identity.

In yet other embodiments, the UE can keep the RACH reports associated with the first PLMN and avoid logging the RACH reports related to the RACH procedure performed over cells with the second PLMN. In other words, the UE can choose to log the RACH reports based on the preferred/prioritized PLMN identity.

Reporting the list of RACH Reports when the UE moves across cells with different PLMN Identities is discussed below.

If the UE keeps the list of RACH reports related to the RACH procedures performed over the cells associated with the first PLMN identity, it can follow one of the following actions upon request by network to report the list of the RACH reports:

In some embodiments, upon the request by network, the UE reports only the RACH reports associated with the cells with PLMN identity equal to the RPLMN of the current serving cell and discards the rest of the logged RACH reports in VarRACHReport that are associated to the other PLMNs.

In other embodiments, upon the request by network, the UE reports the RACH reports associated with the cells with PLMN identity equal to the RPLMN of the current serving cell and keeps the rest of the logged RACH reports in VarRACHReport that are associated with the other PLMNs.

In yet other embodiments, upon the request by network, the UE sends the RACH reports belonging to all the PLMNs.

Detailed embodiments of method-2 are discussed below.

In this method, the UE's RRC layer sends an indication to the RAN node's RRC layer every time the UE successfully completes a random-access procedure. An example of such a report may be provided as a UEInformationAvailable message as shown in Table 9.

Detailed embodiments of method-2a are discussed below.

In this method, the MAC entity of the UE signals the RRC layer of the UE, the selected beam indexes wherein RACH attempts have been performed.

In yet other embodiments of the same method, the MAC entity of the UE may signal the timestamps associated to the time that UE has performed RACH over the selected beams.

When UE's MAC entity performs RACH, the RRC layer is not aware of that. Hence providing the selected beam indexes for RACH attempts as well as the time stamps of the RACH attempts (i.e., absolute or relative time when UE performed a RACH attempt) to the RRC layer allows the RRC layer to collect the measurements corresponding to the downlink beam quality of the selected beams at the time when UE performed the measurement.

In still other embodiments, the RRC layer at UE may collect the measurement (of the reported beam) performed right after or before the reported timestamp.

In yet other embodiments, the RRC layer may collect the latest available L3 filtered measurement, regardless of the time stamps of the attempted RACH reported by the MAC entity.

Detailed embodiments of method-3 are discussed below.

In this method, the F1-C interface is enhanced with a message from the gNB-DU to CU-CP indicating that the UE has successfully completed the random-access procedure. This in turn may trigger the RACH report collection from the CU-CP.

In still other embodiments, the gNB-DU may signal to the gNB-CU about the beam index that the UE has successfully performed RACH over that beam.

Forwarding the RACH report over Xn and F1 interface is discussed below.

In this method, when a RACH report, that here in this disclosure comprises multiple RACH reports associated with a cell using Cell ID, is reported to the network, the RAN node receiving this RACH report may forward the RACH report to the RAN node in which the cell with the cell ID in the RACH report belongs to that RAN node.

In still further embodiments, the RACH report forwarded to the RAN node owning the cell indicated in Cell ID as part of RACH report, will be forwarded from CU to the DU of the same RAN node owning the cell indicated by cell ID in the RACH report (e.g., in 5G network over F1 interface from CU to the corresponding DU owning the cell wherein the RACH has been performed).

An example of text that may be applied to 3GPP TS 38.473 (F1 interface specification in NG-RAN node) cap-

TABLE 9

Figure 14:
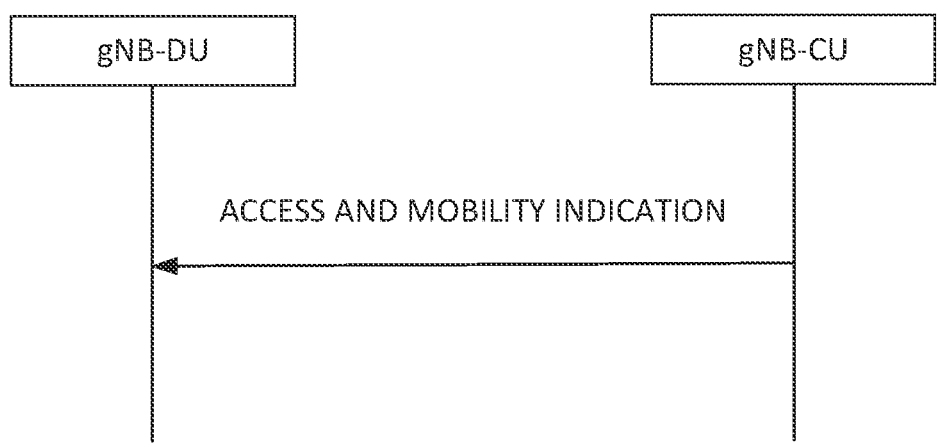
FIG. 14 is an illustration of an Access and Mobility Indication procedure, according to some embodiments of inventive concepts.

```
--      ASN1START
--      TAG-UEINFORMATIONAVAILABLE-START
UEInformationAvailable ::=          SEQUENCE {
        criticalExtensions          CHOICE {
            ueInformationAvailable      UEInformationAvailable-IEs,
            criticalExtensionsFuture    SEQUENCE { }
        }
}
UEInformationAvailable-IEs ::=      SEQUENCE {
        rach-InfoAvailable          ENUMERATED {true}       OPTIONAL,
        lateNonCriticalExtension        OCTET STRING
OPTIONAL,
        nonCriticalExtension        SEQUENCE{ }
OPTIONAL
}
--      TAG-UEINFORMATIONAVAILABLE-STOP
--      ASN1STOP
``` turing the embodiments on forwarding the RACH report over F1 interface is discussed below. This text may be added to 3GPP TS 38.473 as Section 8.2.x, Section 8.2.x.1, Section 8.2.x.2, FIG. 8.2.x.2.-1 (provided as FIG. 14), and Section 9.2.1.x.

Figure 8:
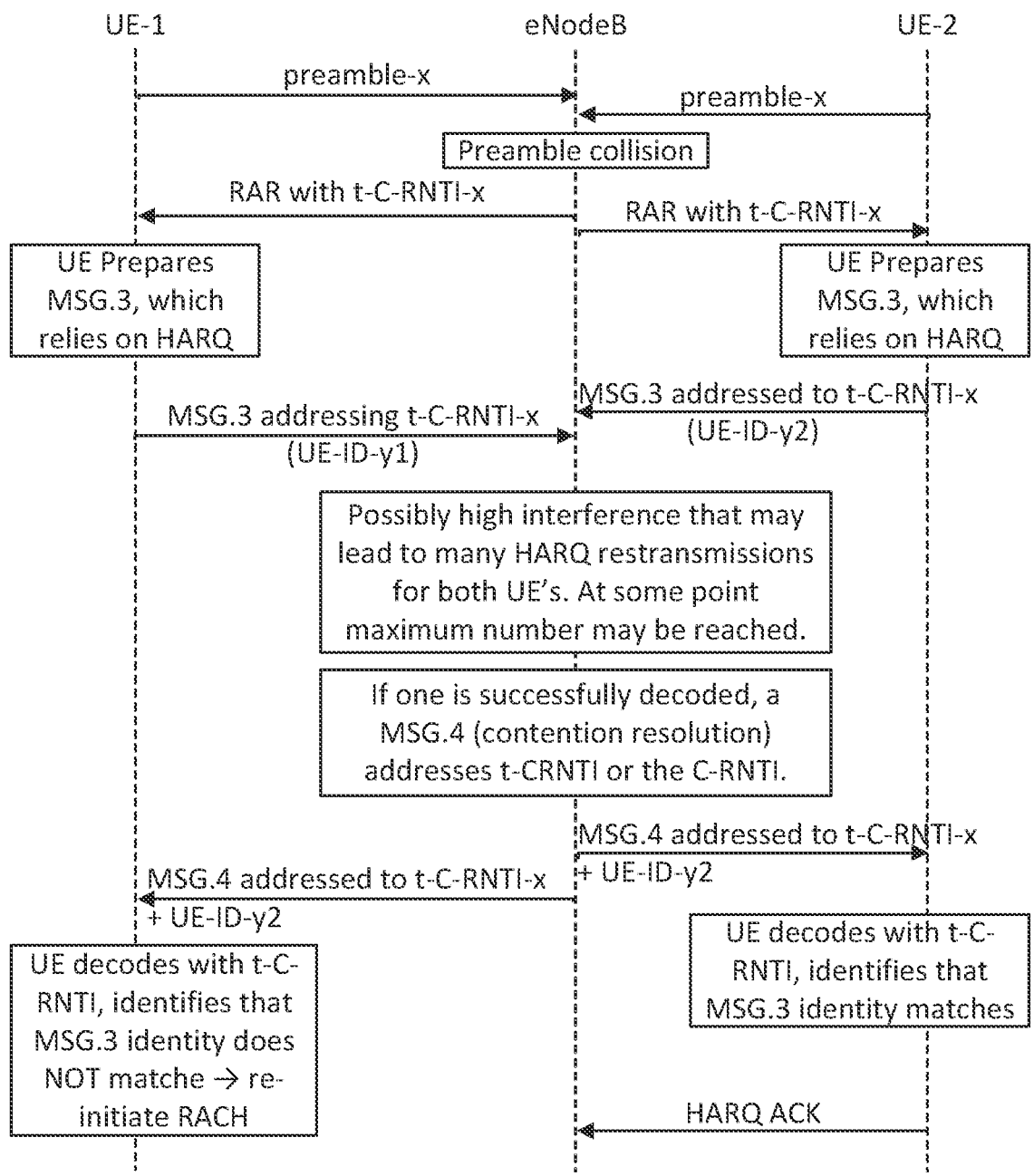
FIG. 8 is a message diagram illustrating preamble collision.
Figure 9A:
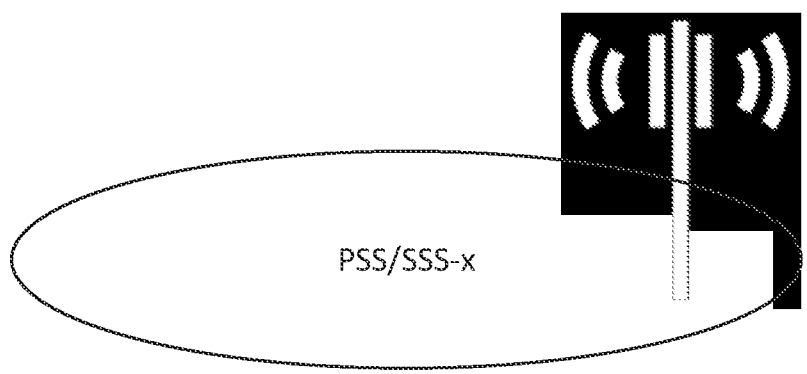
FIG. 9A is a diagram illustrating a cell in NR transmitting in 1 downlink beam.
Figure 9B:
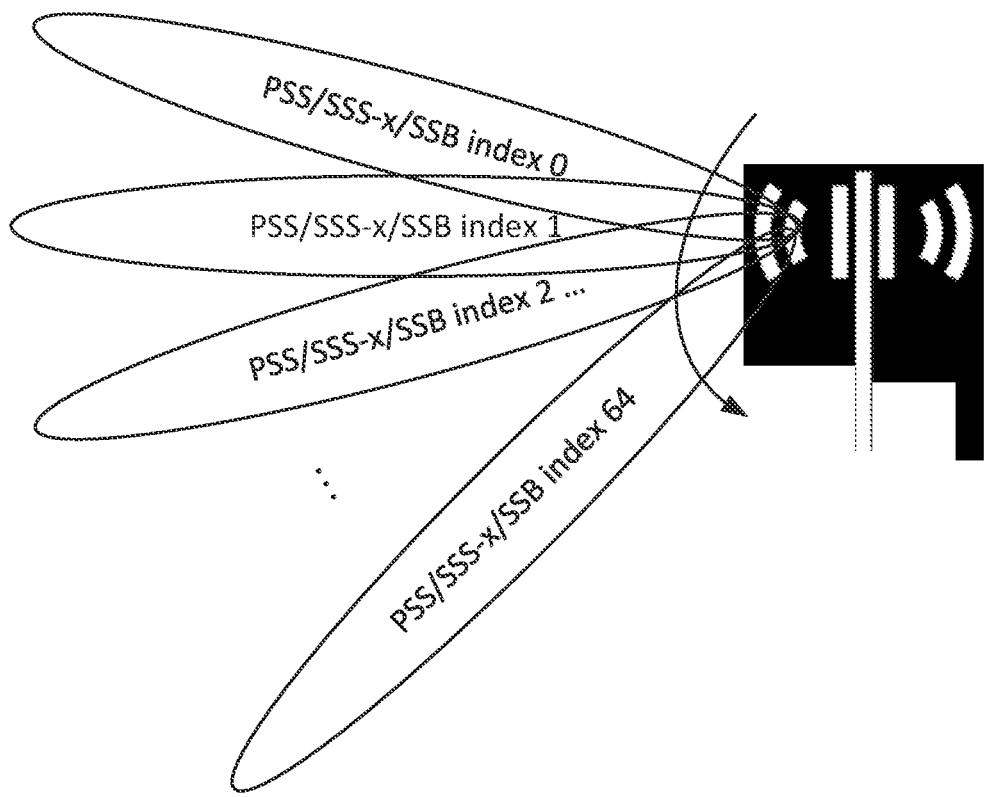
FIG. 9B is a diagram illustrating a cell in NR transmitting in multiple downlink beams.
Figure 11:
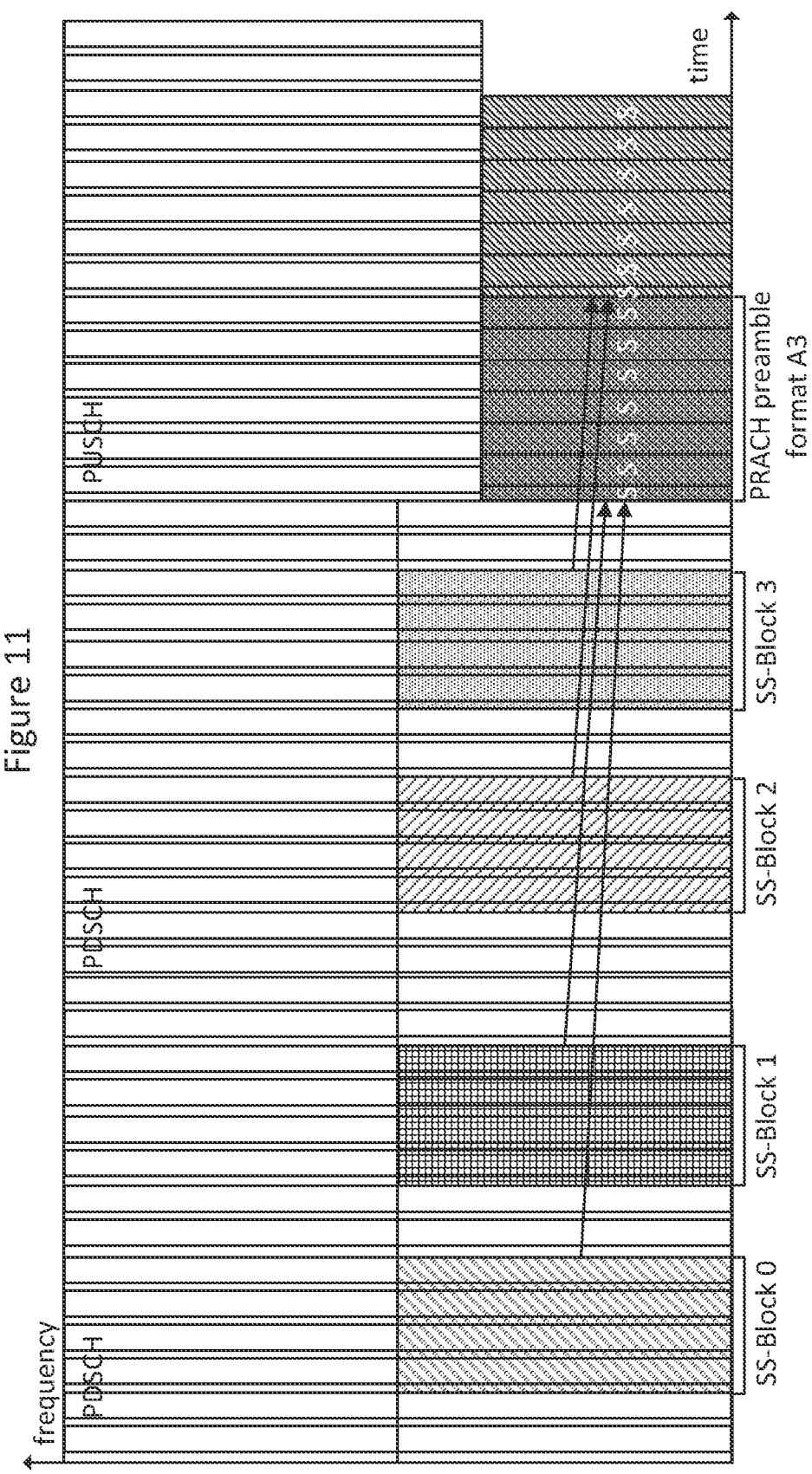
Figure 12C:
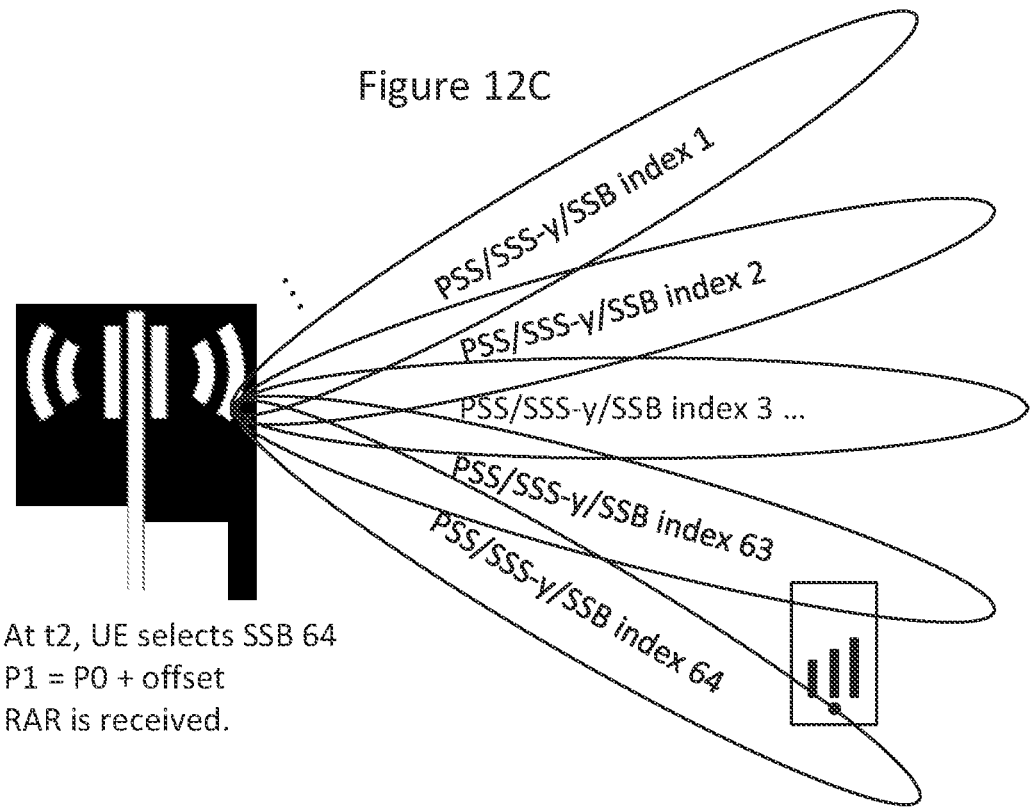

8.2.x Access and Mobility Indication
8.2.x.1 General
The Access and Mobility Indication procedure is initiated by gNB-CU in order to report to the gNB-DU information concerning access and mobility functions and configurations managed by the gNB-DU.
8.2.x.2 Successful Operation
FIG. 8.2.x.2-1: Failure Indication procedure. Successful operation (provided as FIG. 14)
The Access and Mobility Indication procedure is initiated by ACCESS AND MOBILITY INDICATION message sent from the gNB-CU.
If the ACCESS AND MOBILITY INDICATION message contains the RLF Report Container IE and/or if the ACCESS AND MOBILITY INDICATION message contains the RACH Report Container IE the gNB-DU shall take it into account for possible optimization of mobility and RACH access procedures. By means of the ACCESS AND MOBILITY INDICATION message containing the RACH Report (in RACH Report Container) the gNB-DU can receive information about RACH access procedures conducted towards a cell served by the gNB-DU and it can thus use such information to, for example, optimize RACH configurations or to optimize beam configuration for optimal coverage and UE access.
9.2.1.x ACCESS AND MOBILITY INDICATION
This message is sent by the gNB-CU and is used to indicate information concerning access and mobility functions and configurations managed by the gNB-DU.
Direction: gNB-CU gNB-DU instructions of a module are executed by respective wireless device processing circuitry 303, processing circuitry 303 performs respective operations of the flow chart.

At block 1501, processing circuitry 303 may register with a first PLMN having a first PLMN identity.

At block 1505, processing circuitry 303 may perform a first plurality of RA procedures while registered with the first PLMN (e.g., transmitting one or more RA preambles through transceiver 301 for each RA Procedure).

At block 1509, processing circuitry 303 may store, in memory 305, first information related to the first plurality of random access RA procedures associated with the first Public Land Mobile Network PLMN having a first PLMN Identity.

At block 1511, processing circuitry 303 may register with a second PLMN having a second PLMN identity after registering with the first PLMN and after performing the first plurality of RA procedures.

At block 1513, processing circuitry 303 may discard the first information from memory 305 responsive to registering with the second PLMN.

At block 1515, processing circuitry 303 may perform a second plurality of RA procedures while registered with the second PLMN (e.g., transmitting one or more RA preambles through transceiver 301 for each RA procedure).

At block 1519, processing circuitry 303 may store, in the memory 305, second information related to the second plurality of RA procedures associated with the second PLMN having the second PLMN Identity different than the first PLMN identity.

At block 1521, processing circuitry 303 may receive (through transceiver 301) a RACH report request from the second PLMN after storing the first information and after storing the second information.

At block 1525, processing circuitry 303 may transmit (through transceiver 301) an information message to at least

TABLE 10

| IE/Group Name | Presence | Range | IE type and reference | Semantics description | Criticality |
|---|---|---|---|---|---|
| Message Type | M | | 9.3.1.1 | | |
| gNB-CU UE F1AP ID | M | | 9.3.1.4 | | |
| gNB-DU UE F1AP ID | M | | 9.3.1.5 | | |
| Access and Mobility Info | | 1 | | | |
| >RLF Report Container | O | | OCTET STRING | RLF -Report-r16 IE contained in the UEInformationResponse message (TS 38.331) | |
| >RACH Report Container | O | | OCTET STRING | RACH -Report-r16 IE contained in the UEInformationResponse message (TS 38.331) | |

The message structure in Table 10 shows that a single procedure over the F1 interface can be used to forward from gNB-CU-CP to gNB-DU mobility and access information such as the RACH Report but also the RLF Report.

Operations of the wireless device 300 (implemented using the structure of the block diagram of FIG. 1) will now be discussed with reference to the flow chart of FIG. 15 according to some embodiments of inventive concepts. For example, modules may be stored in memory 305 of FIG. 1, and these modules may provide instructions so that when the one of the first PLMN and/or the second PLMN, wherein the information message includes a plurality of RACH reports corresponding to the first plurality of RA procedures associated with the first PLMN identity based on the first information and/or corresponding to the second plurality of RA procedures associated with the second PLMN identity based on the second information. For example, the information message may be transmitted to the second PLMN responsive to receiving the RACH report request from the second PLMN (at block 1521). According to some other embodiments, a RACH report request may be omitted. According to some embodiments where the first information is discarded responsive to registering with the second PLMN, processing circuitry 303 may transmit the information message at block 1525 to the second PLMN only with the information message including a plurality of RACH reports corresponding to the second plurality of RA procedures associated with the second PLMN identity based on the second information.

According to some embodiments, processing circuitry 303 may transmit the information message to the second PLMN at block 1525 after performing the second plurality of RA procedures, wherein the information message includes a plurality of RACH reports corresponding to the second plurality of RA procedures associated with the second PLMN identity based on the second information. According to such embodiments, the information message may omit RACH reports corresponding to the first plurality of RA Procedures associated with the first PLMN Identity, and/or processing circuitry 303 may discard the first information from the memory 305 responsive to registering with the second PLMN.

According to some embodiments, the information message of block 1525 may include a first plurality of RACH reports corresponding to the first plurality of RA procedures associated with the first PLMN identity based on the first information and a second plurality of RACH reports corresponding to the second plurality of RA procedures associated with the second PLMN identity based on the second information.

According to some embodiments, the information message of block 1525 may include a plurality of RACH reports corresponding to the second plurality of RA procedures associated with the second PLMN identity based on the second information, and it may omit RACH reports corresponding to the first plurality of RA procedures associated with the first PLMN identity based on the first information. According to such embodiments, processing circuitry 303 may discard, from the memory 305, the first information related to the first plurality of RA procedures responsive to receiving the RACH report request from the second PLMN, or processing circuitry 303 may maintain the first information in the memory after transmitting the information message.

According to some embodiments, each one of the plurality of RACH reports corresponding to the second plurality of RA procedures includes the second PLMN identity. According to some embodiments, the first information includes an indication of a number of RACH preambles sent for the respective RA procedure for each one of the first plurality of RA procedures, the second information includes an indication of a number of RACH preambles sent for the respective RA procedure for each one of the second plurality of RA procedures, and each RACH report of the plurality of RACH reports includes the indication of the number of RACH preambles sent for the second plurality of RA procedures. According to some embodiments, the first information includes a contention detected flag for each one of the first plurality of RA procedures indicating whether contention resolution was unsuccessful for at least one of the RACH preambles sent for the respective RA procedure, the second information includes a contention detected flag for each one of the second plurality of RA procedures indicating whether contention resolution was unsuccessful for at least one of the RACH preambles sent for the respective RA procedure, and each RACH report of the plurality of RACH reports includes the contention detected flag for the respective one of the RA procedures for the second plurality of RA procedures.

Figure 15:
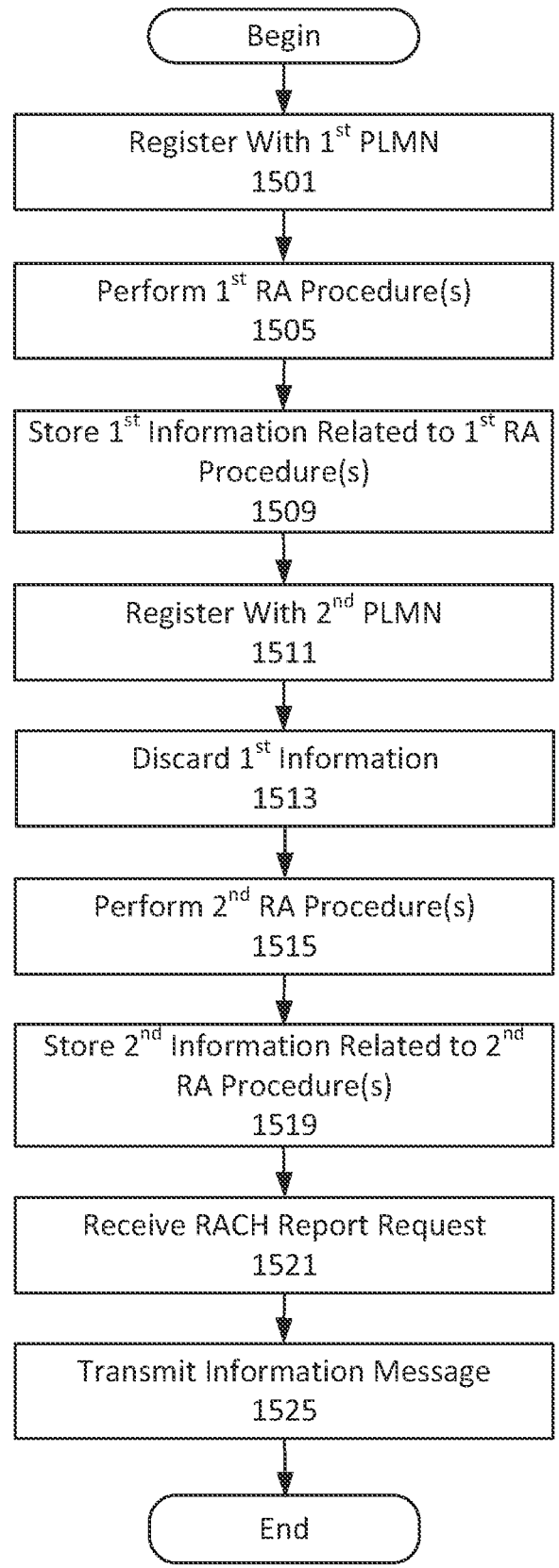
FIGS. 15 and 16 are flow charts illustrating operations of a wireless device according to some embodiments of inventive concepts.

Various operations from the flow chart of FIG. 15 may be optional with respect to some embodiments of wireless devices and related methods. Regarding methods of example embodiment 65 (set forth below), for example, operations of blocks 1501, 1505, 1511, 1513, 1515, and 1521 of FIG. 15 may be optional.

Operations of the wireless device 300 (implemented using the structure of the block diagram of FIG. 1) will now be discussed with reference to the flow chart of FIG. 16 according to some embodiments of inventive concepts. For example, modules may be stored in memory 305 of FIG. 1, and these modules may provide instructions so that when the instructions of a module are executed by respective wireless device processing circuitry 303, processing circuitry 303 performs respective operations of the flow chart.

At block 1601, processing circuitry 303 may register with a first Public Land Mobile Network PLMN having a first PLMN identity.

At block 1605, processing circuitry 303 may perform a first plurality of Random Access RA procedures while registered with the first PLMN.

At block 1609, processing circuitry 303 may store information related to the first plurality of RA procedures associated with the first PLMN, having the first PLMN Identity.

At block 1610, processing circuitry 303 may transmit an information message to at least one of the first PLMN and/or the second PLMN, wherein the information message includes a plurality of RACH reports corresponding to the first plurality of RA procedures associated with the first PLMN identity based on the first information. According to some embodiments, processing circuitry 303 may transmitting the information message to the first PLMN before registering with the second PLMN.

At block 1611, processing circuitry 303 may register with a second PLMN having a second PLMN identity after registering with the first PLMN and after performing the first plurality of RA procedures, wherein the first and second PLMN identities are different.

At block 1615, processing circuitry 303 may perform a second plurality of RA procedures while registered with the second PLMN without storing information related to the second plurality of RA procedures.

According to some embodiments, for each one of the first plurality of RA procedures the information may include an indication of a number of random access channel RACH preambles sent for the respective RA procedure, and each RACH report of the plurality of RACH reports may include the indication of the number of RACH preambles sent for the respective one of the RA procedures of the first plurality of RA procedures.

According to some embodiments, for each one of the first plurality of RA procedures the first information may include a contention detected flag indicating whether contention resolution was unsuccessful for at least one of the RACH preambles sent for the respective RA procedure, and each RACH report of the plurality of RACH reports may include the contention detected flag for the respective one of the RA procedures of the first plurality of RA procedures.

Figure 16:
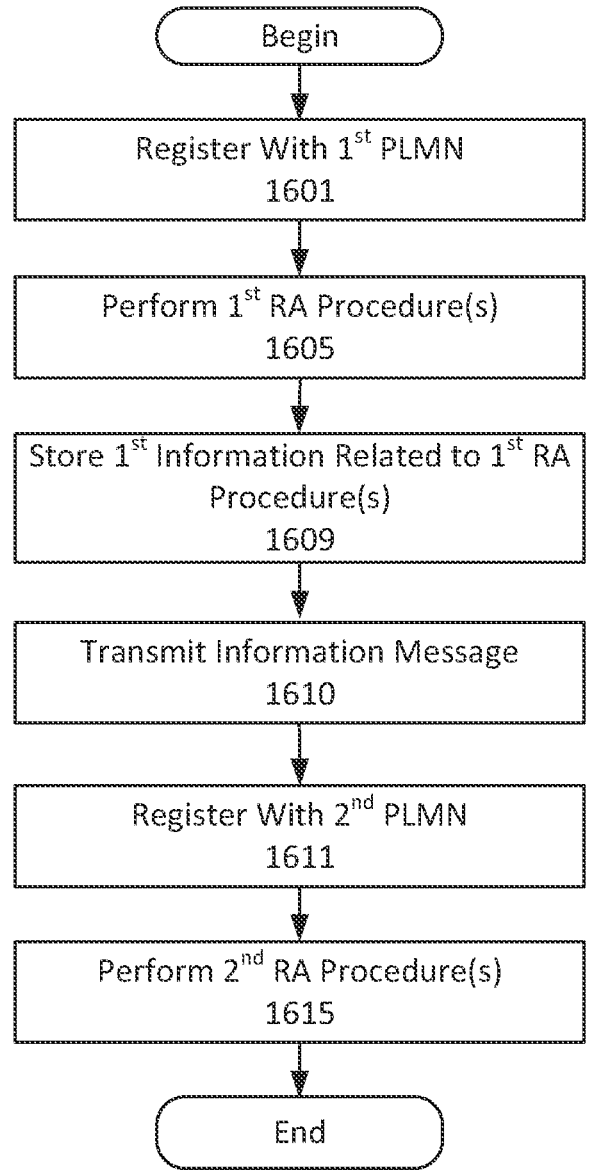

Various operations from the flow chart of FIG. 16 may be optional with respect to some embodiments of wireless devices and related methods. Regarding methods of example embodiment 82 (set forth below), for example, operations of block 1610 of FIG. 16 may be optional.

Example embodiments are discussed below.

1. A method of operating a wireless device providing communication with a wireless network, the method comprising: storing information related to a plurality of random access, RA, procedures, wherein for each one of the plurality of RA procedures the information includes an indication of a number of random access channel, RACH, preambles sent for the respective RA procedure; and transmitting an information message to a cell of the wireless network, wherein the information message includes a plurality of RACH reports corresponding to the plurality of RA procedures, wherein each RACH report of the plurality of RACH reports includes the indication of the number of RACH preambles sent for the respective one of the plurality of RA procedures.

2. The method of Embodiment 1, wherein the information message comprises a Radio Resource Control, RRC, message.

3. The method of any of Embodiments 1-2, wherein the information message includes the plurality of RACH reports and a RACH report list size indicating a number of the plurality of RACH reports included in the information message.

4. The method of any of Embodiments 1-3, further comprising: transmitting a notification to the cell of the wireless network after storing the information, wherein the notification indicates availability of the information relating to the plurality of RA procedures; and receiving an information request message from the cell of the wireless network after transmitting the notification; wherein the information message is transmitted as an information response message in response to receiving the information request message.

5. The method of Embodiment 4, wherein the notification is included as an information element of a Radio Resource Control, RRC, message, wherein the information element indicates that RACH information is available.

6. The method of any of Embodiments 4-5, wherein the notification is included in a measurement report message.

7. The method of any of Embodiments 1-6, wherein each RACH report of the plurality of RACH reports further includes a contention detected flag indicating whether contention resolution was unsuccessful for at least one of the RACH preambles sent for the respective RA procedure.

8. The method of any of Embodiments 1-7 further comprising: performing the plurality of RA procedures, wherein each of the plurality of RA procedures is performed for a use case including at least one of, downlink or uplink data arrival during a radio resource control, RRC, connected state when an uplink synchronization status is non-synchronized, uplink data arrival during an RRC connected state where there are no physical uplink control channel, PUCCH, resources available for scheduling request, SR, establishing time alignment at addition of an SCell, and/or beam failure recovery.

9. The method of any of Embodiments 1-8, wherein all of the plurality of RA procedures are directed to the cell.

10. The method of any of Embodiments 1-8, wherein for each one of the plurality of RA procedures the information further includes a cell identity associated with the respective RA procedure, and wherein each RACH report of the plurality of RACH reports further includes the cell identity associated with the respective RA procedure.

11. The method of Embodiment 10, wherein a first cell identity is associated with a first RA procedure of the plurality of RA procedures, wherein a second cell identity is associated with a second RA procedure of the plurality of RA procedures, and wherein the first and second cell identities are different.

12. The method of any of Embodiments 10-11, wherein the cell identity comprises at least one of a local identity of the cell and/or a global identity of the cell.

13. The method of any of Embodiments 1-12, wherein for each of the plurality of RA procedures the information further includes a public land mobile network, PLMN, identity associated with the respective RA procedure.

14. The method of Embodiment 13, wherein transmitting the information message comprises transmitting the information message responsive to the PLMN identity matching a PLMN identity associated with the cell.

15. A method of operating a radio access network, RAN, the method comprising: receiving an information message from a wireless device, wherein the information message includes a plurality of random access channel, RACH, reports corresponding to a respective plurality of random access, RA, procedures, wherein each RACH report of the plurality of RACH reports includes an indication of a number of RACH preambles sent for the respective one of the plurality of RA procedures.

16. The method of Embodiment 15, wherein the information message comprises a Radio Resource Control, RRC, message.

17. The method of any of Embodiments 15-16, wherein the information message includes the plurality of RACH reports and a RACH report list size indicating a number of the plurality of RACH reports included in the information message.

18. The method of any of Embodiments 15-17, further comprising: receiving a notification from the wireless device, wherein the notification indicates availability of RACH information; and transmitting an information request message from the cell of the wireless network responsive to receiving the notification; wherein the information message is received as an information response message corresponding to the information request message.

19. The method of Embodiment 18, wherein the notification is included as an information element of a Radio Resource Control, RRC, message, wherein the information element indicates that RACH information is available.

20. The method of any of Embodiments 18-19, wherein the notification is included in a measurement report message.

21. The method of any of Embodiments 15-20, wherein each RACH report of the plurality of RACH reports further includes a contention detected flag indicating whether contention resolution was unsuccessful for at least one of the RACH preambles sent for the respective RA procedure.

22. The method of any of Embodiments 15-21, wherein each of the plurality of RA procedures was performed for a use case including at least one of, downlink or uplink data arrival during a radio resource control, RRC, connected state when an uplink synchronization status is non-synchronized, uplink data arrival during an RRC connected state where there are no physical uplink control channel, PUCCH, resources available for scheduling request, SR, establishing time alignment at addition of an SCell, and/or beam failure recovery.

23. The method of any of Embodiments 15-22, wherein all of the plurality of RA procedures were directed to the cell.

24. The method of any of Embodiments 15-22, wherein each RACH report of the plurality of RACH reports further includes a cell identity associated with the respective RA procedure.

25. The method of Embodiment 24, wherein a first cell identity is associated with a first RA procedure of the plurality of RA procedures, wherein a second cell identity is associated with a second RA procedure of the plurality of RA procedures, and wherein the first and second cell identities are different.

26. The method of Embodiment 25, wherein the information message is received at a first RAN node, wherein one of the plurality of RACH reports includes a respective cell identity associated with a cell of second RAN node, the method further comprising: transmitting information of the one of the plurality of RACH reports from the first RAN node to the second RAN node responsive to the respective cell identity being associated with the cell of the second RAN node.

27. The method of Embodiment 26, wherein the information of the one of the plurality of RACH reports is transmitted to the second RAN node in a RACH indication message.

28. The method of any of Embodiments 26-27, wherein the information of the one of the plurality of RACH reports is transmitted from the first RAN node to the second RAN node over an X2/Xn interface.

29. The method of any of Embodiments 24-28, wherein the cell identity comprises at least one of a local identity of the cell and/or a global identity of the cell.

30. The method of any of Embodiments 15-29, wherein for each of the plurality of RA procedures the information further includes a public land mobile network, PLMN, identity associated with the respective RA procedure.

31. A method of operating a radio access network, RAN, the method comprising: receiving an indication at a radio resource control, RRC, entity of the RAN that a wireless device has successfully completed a random access, RA, procedure, wherein the indication is received from a medium access control, MAC, entity; initiating transmission of an information request message from the RRC entity to the wireless device responsive to the indication that the wireless device has successfully completed the RA procedure; and receiving an information response message from the wireless device, wherein the information response message includes a random access channel, RACH, report for the RA procedure, and wherein the information response message corresponds to the information request message.

32. The method of Embodiment 31, wherein the RACH report includes an indication of a number of RACH preambles sent for the RA procedure.

33. The method of any of Embodiments 31-32, wherein the RACH report further includes a contention detected flag indicating whether contention resolution was unsuccessful for at least one of the RACH preambles sent for the RA procedure.

34. The method of any of Embodiments 31-33, wherein each of the information request message and the information response message comprises a respective Radio Resource Control, RRC, message.

35. The method of any of Embodiments 31-34, wherein the indication that the wireless device has successfully completed the RA procedure is received at the RRC entity over an F1 interface from the MAC entity.

36. The method of Embodiment 35, wherein the F1 interface is an F1-C interface.

37. The method of any of Embodiments 31-36, wherein the RRC entity is provided in a central unit, CU, node of the RAN, and wherein the MAC entity is provided in a distributed unit, DU, node of the RAN.

38. The method of Embodiment 37, wherein the CU and DU nodes are provided as elements of a node B of the RAN.

39. The method of any of Embodiments 31-38 further comprising: transmitting the RACH report to the MAC entity.

40. The method of Embodiment 39, wherein the RACH report includes a cell identity associated with a cell supported by the MAC entity, and wherein the RACH report is transmitted to the MAC entity responsive to the RACH report including the cell identity associated with the cell supported by the MAC entity.

41. The method of any of Embodiments 39-40, wherein the RACH report is transmitted to the MAC entity as an element of an access and mobility indication message.

42. The method of any of Embodiments 39-41, wherein the RACH report is transmitted over an F1 interface.

43. The method of any of Embodiments 31-38, wherein the RRC entity is a first RRC entity, wherein a first cell identity is associated with the MAC entity, wherein the RACH report includes a second cell identity, and wherein the first and second cell identities are different, the method further comprising: transmitting the RACH report to a second RRC entity different than the first RRC entity responsive to the second cell identity being associated with the second RRC entity.

44. The method of any of Embodiments 31-38, wherein the RRC entity is provided at a first RAN node, wherein a first cell identity is associated with the MAC entity, wherein the RACH report includes a second cell identity, and wherein the first and second cell identities are different, the method further comprising: transmitting the RACH report to a second RAN node different than the first RAN node responsive to the second cell identity being associated with the second RAN node.

45. The method of any of Embodiments 31-44, wherein each of the RA procedures was performed for a use case including at least one of, downlink or uplink data arrival during a radio resource control, RRC, connected state when an uplink synchronization status is non-synchronized, uplink data arrival during an RRC connected state where there are no physical uplink control channel, PUCCH, resources available for scheduling request, SR, establishing time alignment at addition of an SCell, and/or beam failure recovery.

46. A method of operating a wireless device providing communication with a wireless network, the method comprising: performing a random access, RA, procedure toward a cell of the wireless network; and transmitting an information available message to the cell responsive to successful completion of the RA procedure toward the cell, wherein the information available message includes an indication that random access channel, RACH, information for the RA procedure is available.

47. The method of Embodiment 46, wherein the information available message is transmitted as a Radio Resource Control, RRC, message.

48. The method of any of Embodiments 46-47, wherein transmitting the information available message is initiated from a Radio Resource Control, RRC, entity provided at the wireless device.

49. The method of any of Embodiments 46-48 further comprising: receiving an information request message from the cell of the wireless network after transmitting the information available message; and transmitting an information response message in response to receiving the information request message, wherein the information response message includes a RACH report for the RA procedure.

50. The method of Embodiment 49, wherein the RACH report includes at least one of an indication of a number of RACH preambles sent for the RA procedure, and/or a contention detected flag indicating whether contention resolution was unsuccessful for at least one of the RACH preambles sent for the RA procedure.

51. The method of any of Embodiments 46-50 further comprising: transmitting information regarding the RA procedure from a medium access control, MAC, entity of the wireless device to a radio resource control, RRC, entity of the wireless device.

52. The method of Embodiment 51, wherein the information availability message is initiated from the RRC entity of the wireless device responsive to receiving the information regarding the RA procedure from the MAC entity of the wireless device.

53. The method of any of Embodiments 51-52, wherein the information regarding the RA procedure includes at least one of, one or more beam indexes associated with RACH preamble transmissions of the RA procedure, and/or timestamps associated with RACH preamble transmissions of the RA procedure.

54. The method of any of Embodiments 46-53, wherein each of the RA procedures is performed for a use case including at least one of, downlink or uplink data arrival during a radio resource control, RRC, connected state when an uplink synchronization status is non-synchronized, uplink data arrival during an RRC connected state where there are no physical uplink control channel, PUCCH, resources available for scheduling request, SR, establishing time alignment at addition of an SCell, and/or beam failure recovery.

55. A method of operating a radio access network, RAN, the method comprising: receiving an information available message from a wireless device at a cell of the RAN, wherein the information available message includes an indication that random access channel, RACH, information for the RA procedure is available; transmitting an information request message from the cell of the wireless network to the wireless device responsive to receiving the information available message; and receiving an information response message from the wireless device, wherein the information response message includes a RACH report for the RA procedure, and wherein the information response message corresponds to the information request message.

56. The method of Embodiment 55, wherein the RACH report includes at least one of an indication of a number of RACH preambles sent for the RA procedure, and/or a contention detected flag indicating whether contention resolution was unsuccessful for at least one of the RACH preambles sent for the RA procedure.

57. A wireless device (300), the wireless device comprising: processing circuitry (303); and memory (305) coupled with the processing circuitry, wherein the memory includes instructions that when executed by the processing circuitry causes the wireless device to perform operations according to any of Embodiments 1-14 and 46-54.

58. A wireless device (300), wherein the wireless device is adapted to perform according to any of Embodiments 1-14 and 46-54.

59. A computer program comprising program code to be executed by processing circuitry (303) of a wireless device (300), whereby execution of the program code causes the wireless device (300) to perform operations according to any of embodiments 1-14 and 46-54.

60. A computer program product comprising a non-transitory storage medium including program code to be executed by processing circuitry (303) of a wireless device (300) configured to operate in a communication network, whereby execution of the program code causes the wireless device (300) to perform operations according to any of embodiments 1-14 and 46-54.

61. A radio access network, RAN, node (400), the RAN node comprising: processing circuitry (403); and memory (405) coupled with the processing circuitry, wherein the memory includes instructions that when executed by the processing circuitry causes the RAN node to perform operations according to any of Embodiments 15-45 and 55-56.

62. A first radio access network, RAN, node (400), wherein the RAN node is adapted to perform according to any of Embodiments 15-45 and 55-56.

63. A computer program comprising program code to be executed by processing circuitry (403) of a radio access network, RAN, node (400), whereby execution of the program code causes the RAN node (400) to perform operations according to any of embodiments 15-45 and 55-56.

64. A computer program product comprising a non-transitory storage medium including program code to be executed by processing circuitry (403) of a radio access network, RAN, node (400), whereby execution of the program code causes the RAN node (400) to perform operations according to any of embodiments 15-45 and 55-56.

65. A method of operating a wireless device (300) providing communication with a wireless network, the method comprising: storing (1509), in memory (305), first information related to a first plurality of random access, RA, procedures associated with a first Public Land Mobile Network, PLMN, having a first PLMN Identity; storing (1519), in the memory (305), second information related to a second plurality of RA procedures associated with a second PLMN having a second PLMN Identity different than the first PLMN identity; and transmitting (1525) an information message to at least one of the first PLMN and/or the second PLMN, wherein the information message includes a plurality of RACH reports corresponding to the first plurality of RA procedures associated with the first PLMN identity based on the first information and/or corresponding to the second plurality of RA procedures associated with the second PLMN identity based on the second information.

66. The method of Embodiment 65 further comprising: registering (1501) with the first PLMN having the first PLMN identity; performing (1505) the first plurality of RA procedures while registered with the first PLMN; registering (1511) with the second PLMN having the second PLMN identity after registering with the first PLMN and after performing the first plurality of RA procedures; and performing (1505) the second plurality of RA procedures while registered with the second PLMN.

67. The method of Embodiment 66, wherein transmitting the information message comprises transmitting the information message to the second PLMN after performing the second plurality of RA procedures, wherein the information message includes a plurality of RACH reports corresponding to the second plurality of RA procedures associated with the second PLMN identity based on the second information.

68. The method of Embodiment 67, wherein the information message omits RACH reports corresponding to the first plurality of RA Procedures associated with the first PLMN Identity.

69. The method of any of Embodiments 66-68 further comprising: discarding the first information from the memory responsive to registering with the second PLMN.

70. The method of any of Embodiments 65-66, wherein the information message includes a first plurality of RACH reports corresponding to the first plurality of RA procedures associated with the first PLMN identity based on the first information and a second plurality of RACH reports corresponding to the second plurality of RA procedures associated with the second PLMN identity based on the second information.

71. The method of any of Embodiments 65-66 further comprising: receiving (1521) a RACH report request from the second PLMN after storing the first information and after storing the second information; wherein transmitting the information message comprises transmitting the information message to the second PLMN responsive to receiving the RACH report request from the second PLMN.

72. The method of Embodiment 71, wherein the information message includes a plurality of RACH reports corresponding to the second plurality of RA procedures associated with the second PLMN identity based on the second information and omits RACH reports corresponding to the first plurality of RA procedures associated with the first PLMN identity based on the first information.

73. The method of Embodiment 72 further comprising: discarding, from the memory, the first information related to the first plurality of RA procedures responsive to receiving the RACH report request from the second PLMN.

74. The method of Embodiment 72 further comprising: maintaining the first information in the memory after transmitting the information message.

75. The method of Embodiment 71, wherein the information message includes a plurality of RACH reports corresponding to the first plurality of RA procedures associated with the first PLMN identity based on the first information and to the second plurality of RA procedures associated with the second PLMN identity based on the second information.

76. The method of any of Embodiments 65-75, wherein for each one of the first plurality of RA procedures the first information includes the first PLMN identity, and wherein for each one of the second plurality of RA procedures the second information includes the second PLMN identity.

77. The method of Embodiment 76, wherein each one of the plurality of RACH reports corresponding to the first plurality of RA procedures includes the first PLMN identity, and/or wherein each one of the plurality of RACH reports corresponding to the second plurality of RA procedures includes the second PLMN identity.

78. The method of any of Embodiments 65-75, wherein the first information related to the first plurality of RA procedures includes the first PLMN identity, and wherein the second information related to the second plurality of RA procedures includes the second PLMN identity.

79. The method of Embodiment 78, wherein the information message includes the first PLMN identity associated with the plurality of RACH reports corresponding to the first plurality of RA procedures, and/or wherein the information message includes the second PLMN identity associated with the plurality of RACH reports corresponding to the second plurality of RA procedures.

80. The method of any of Embodiments 65-79, wherein for each one of the first plurality of RA procedures the first information includes an indication of a number of random access channel, RACH, preambles sent for the respective RA procedure, wherein for each one of the second plurality of RA procedures the second information includes an indication of a number of RACH preambles sent for the respective RA procedure, and wherein each RACH report of the plurality of RACH reports includes the indication of the number of RACH preambles sent for the respective one of the RA procedures of the first plurality of RA procedures and/or for the second plurality of RA procedures.

81. The method of any of Embodiments 65-80, wherein for each one of the first plurality of RA procedures the first information includes a contention detected flag indicating whether contention resolution was unsuccessful for at least one of the RACH preambles sent for the respective RA procedure, wherein for each one of the second plurality of RA procedures the second information includes a contention detected flag indicating whether contention resolution was unsuccessful for at least one of the RACH preambles sent for the respective RA procedure, and wherein each RACH report of the plurality of RACH reports includes the contention detected flag for the respective one of the RA procedures of the first plurality or RA procedures and/or for the second plurality of RA procedures.

82. A method of operating a wireless device providing communication with a wireless network, the method comprising: registering (1601) with a first Public Land Mobile Network, PLMN, having a first PLMN identity; performing (1605) a first plurality of Random Access, RA, procedures while registered with the first PLMN; storing (1609) information related to the first plurality of RA procedures associated with the first PLMN, having the first PLMN Identity; registering (1611) with a second PLMN having a second PLMN identity after registering with the first PLMN and after performing the first plurality of RA procedures, wherein the first and second PLMN identities are different; and performing (1615) a second plurality of RA procedures while registered with the second PLMN without storing information related to the second plurality of RA procedures.

83. The method of Embodiment 82 further comprising: transmitting (1610) an information message to at least one of the first PLMN and/or the second PLMN, wherein the information message includes a plurality of RACH reports corresponding to the first plurality of RA procedures associated with the first PLMN identity based on the first information.

84. The method of Embodiment 83, where transmitting the information message comprises transmitting the information message to the first PLMN before registering with the second PLMN.

85. The method of any of Embodiments 83-84, wherein for each one of the first plurality of RA procedures the information includes an indication of a number of random access channel, RACH, preambles sent for the respective RA procedure, and wherein each RACH report of the plurality of RACH reports includes the indication of the number of RACH preambles sent for the respective one of the RA procedures of the first plurality of RA procedures.

86. The method of any of Embodiments 83-85, wherein for each one of the first plurality of RA procedures the first information includes a contention detected flag indicating whether contention resolution was unsuccessful for at least one of the RACH preambles sent for the respective RA procedure, and wherein each RACH report of the plurality of RACH reports includes the contention detected flag for the respective one of the RA procedures of the first plurality of RA procedures.

87. A method of operating a wireless device providing communication with a wireless network, the method comprising: storing, in memory, first information related to a first random access, RA, procedure associated with a first Public Land Mobile Network, PLMN, having a first PLMN Identity; storing, in the memory, second information related to a second RA procedure associated with a second PLMN having a second PLMN Identity different than the first PLMN identity; and transmitting an information message to at least one of the first PLMN and/or the second PLMN, wherein the information message includes a RACH report corresponding to the first RA procedure associated with the first PLMN identity based on the first information and/or a RACH report corresponding to the second RA procedure associated with the second PLMN identity based on the second information.

88. The method of Embodiment 87 further comprising: registering with the first PLMN having the first PLMN identity; performing the first plurality of RA procedure while registered with the first PLMN; registering with the second PLMN having the second PLMN identity after registering with the first PLMN and after performing the first RA procedure; and performing the second RA procedure while registered with the second PLMN.

89. The method of Embodiment 88, wherein transmitting the information message comprises transmitting the information message to the second PLMN after performing the second RA procedure, wherein the information message includes a RACH report corresponding to the second RA procedure associated with the second PLMN identity based on the second information.

90. The method of Embodiment 89, wherein the information message omits any RACH report corresponding to the first RA Procedure associated with the first PLMN Identity.

91. The method of any of Embodiments 88-90 further comprising: discarding the first information from the memory responsive to registering with the second PLMN.

92. The method of any of Embodiments 87-88, wherein the information message includes a first RACH report corresponding to the first RA procedure associated with the first PLMN identity based on the first information and a second RACH report corresponding to the second RA procedure associated with the second PLMN identity based on the second information.

93. The method of any of Embodiments 87-88 further comprising: receiving a RACH report request from the second PLMN after storing the first information and after storing the second information; wherein transmitting the information message comprises transmitting the information message to the second PLMN responsive to receiving the RACH report request from the second PLMN.

94. The method of Embodiment 93, wherein the information message includes a RACH report corresponding to the second RA procedure associated with the second PLMN identity based on the second information and omits any RACH report corresponding to the first RA procedure associated with the first PLMN identity based on the first information.

95. The method of Embodiment 94 further comprising: discarding, from the memory, the first information related to the first RA procedure responsive to receiving the RACH report request from the second PLMN.

96. The method of Embodiment 94 further comprising: maintaining the first information in the memory after transmitting the information message.

97. The method of Embodiment 93, wherein the information message includes a RACH report corresponding to the first RA procedure associated with the first PLMN identity based on the first information and a RACH report corresponding to the second RA procedure associated with the second PLMN identity based on the second information.

98. The method of any of Embodiments 87-97, wherein for the first RA procedure the first information includes the first PLMN identity, and wherein for the second RA procedure the second information includes the second PLMN identity.

99. The method of Embodiment 98, wherein a RACH report corresponding to the first RA procedure includes the first PLMN identity, and/or wherein a RACH report corresponding to the second RA procedure includes the second PLMN identity.

100. The method of any of Embodiments 87-97, wherein the first information related to the first RA procedure includes the first PLMN identity, and wherein the second information related to the second RA procedure includes the second PLMN identity.

101. The method of Embodiment 100, wherein the information message includes the first PLMN identity associated with the RACH report corresponding to the first RA procedure, and/or wherein the information message includes the second PLMN identity associated with the RACH report corresponding to the second RA procedure.

102. The method of any of Embodiments 87-101, wherein for the first RA procedure the first information includes an indication of a number of random access channel, RACH, preambles sent for the first RA procedure, and wherein for the second RA procedure the second information includes an indication of a number of RACH preambles sent for the second RA procedure.

103. The method of Embodiment 102, wherein a RACH report corresponding to the first RA procedure includes the indication of the number of RACH preambles sent for the first RA procedure and/or wherein a RACH report corresponding to the second RA procedure includes the indication of the number of RACH preambles send for the second RA procedure.

104. The method of any of Embodiments 87-103, wherein for the first RA procedure the first information includes a contention detected flag indicating whether contention resolution was unsuccessful for at least one of the RACH preambles sent for the first RA procedure, and wherein for the second RA procedure the second information includes a contention detected flag indicating whether contention resolution was unsuccessful for at least one of the RACH preambles sent for the second RA procedure.

105. The method of Embodiment 104, wherein a RACH report corresponding to the first RA procedure includes the contention detected flag for the first RA procedure, and/or wherein a RACH report corresponding to the second RA procedure includes the contention detected flag for the second RA procedure.

106. A method of operating a wireless device providing communication with a wireless network, the method comprising: registering with a first Public Land Mobile Network, PLMN, having a first PLMN identity; performing a first Random Access, RA, procedure while registered with the first PLMN; storing information related to the first RA procedure associated with the first PLMN, having the first PLMN Identity; registering with a second PLMN having a second PLMN identity after registering with the first PLMN and after performing the first RA procedure, wherein the first and second PLMN identities are different; and performing a second RA procedure while registered with the second PLMN without storing information related to the second RA procedure.

107. The method of Embodiment 106 further comprising: transmitting an information message to at least one of the first PLMN and/or the second PLMN, wherein the information message includes a RACH report corresponding to the first RA procedure associated with the first PLMN identity based on the first information.

108. The method of Embodiment 107, where transmitting the information message comprises transmitting the information message to the first PLMN before registering with the second PLMN.

109. The method of any of Embodiments 107-108, wherein for the first RA procedure the information includes an indication of a number of random access channel, RACH, preambles sent for the first RA procedure, and wherein the RACH report includes the indication of the number of RACH preambles sent for the first RA procedure.

110. The method of any of Embodiments 107-109, wherein for the first RA procedure the information includes a contention detected flag indicating whether contention resolution was unsuccessful for at least one of the RACH preambles sent for the first RA procedure, and wherein the RACH report of includes the contention detected flag for the first RA procedure.

111. A wireless device (300), the wireless device comprising: processing circuitry (303); and memory (305) coupled with the processing circuitry, wherein the memory includes instructions that when executed by the processing circuitry causes the wireless device to perform operations according to any of Embodiments 65-110.

112. A wireless device (300), wherein the wireless device is adapted to perform according to any of Embodiments 65-110.

113. A computer program comprising program code to be executed by processing circuitry (303) of a wireless device (300), whereby execution of the program code causes the wireless device (300) to perform operations according to any of embodiments 65-110.

114. A computer program product comprising a non-transitory storage medium including program code to be executed by processing circuitry (303) of a wireless device (300), whereby execution of the program code causes the wireless device (300) to perform operations according to any of embodiments 65-110.

Citations are provided below for References identified in the Disclosure above.
Reference [1] 3GPP TS 36.331 V15.7.0 (2019-09)
Reference [2] 3GPP TS 36.321 V15.7.0 (2019-09)
Reference [3] 3GPP TS 38.321 V15.7.0 (2019-09)
Reference [4] 3GPP TS 38.300 V15.7.0 (2019-09)
Reference [5] 3GPP TS 38.423 V15.5.0 (2019-09)
Reference [6] 3GPP TS 38.331 V15.7.0 (2019-09)
Reference [7] 3GPP TS 38.473 V15.7.0 (2019-09)

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 17:
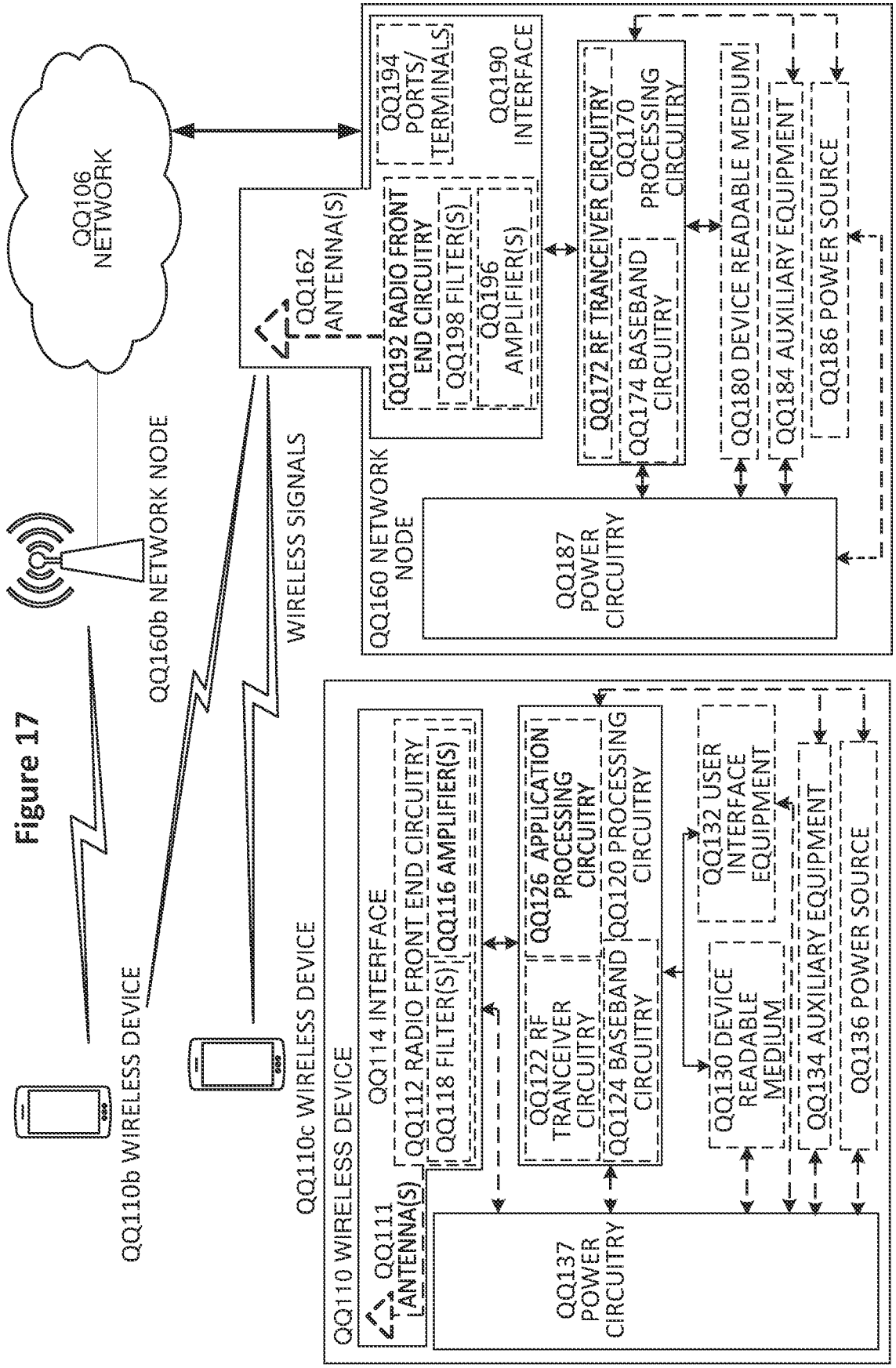
FIG. 17 is a block diagram of a wireless network in accordance with some embodiments.

FIG. 17 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 17 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 18:
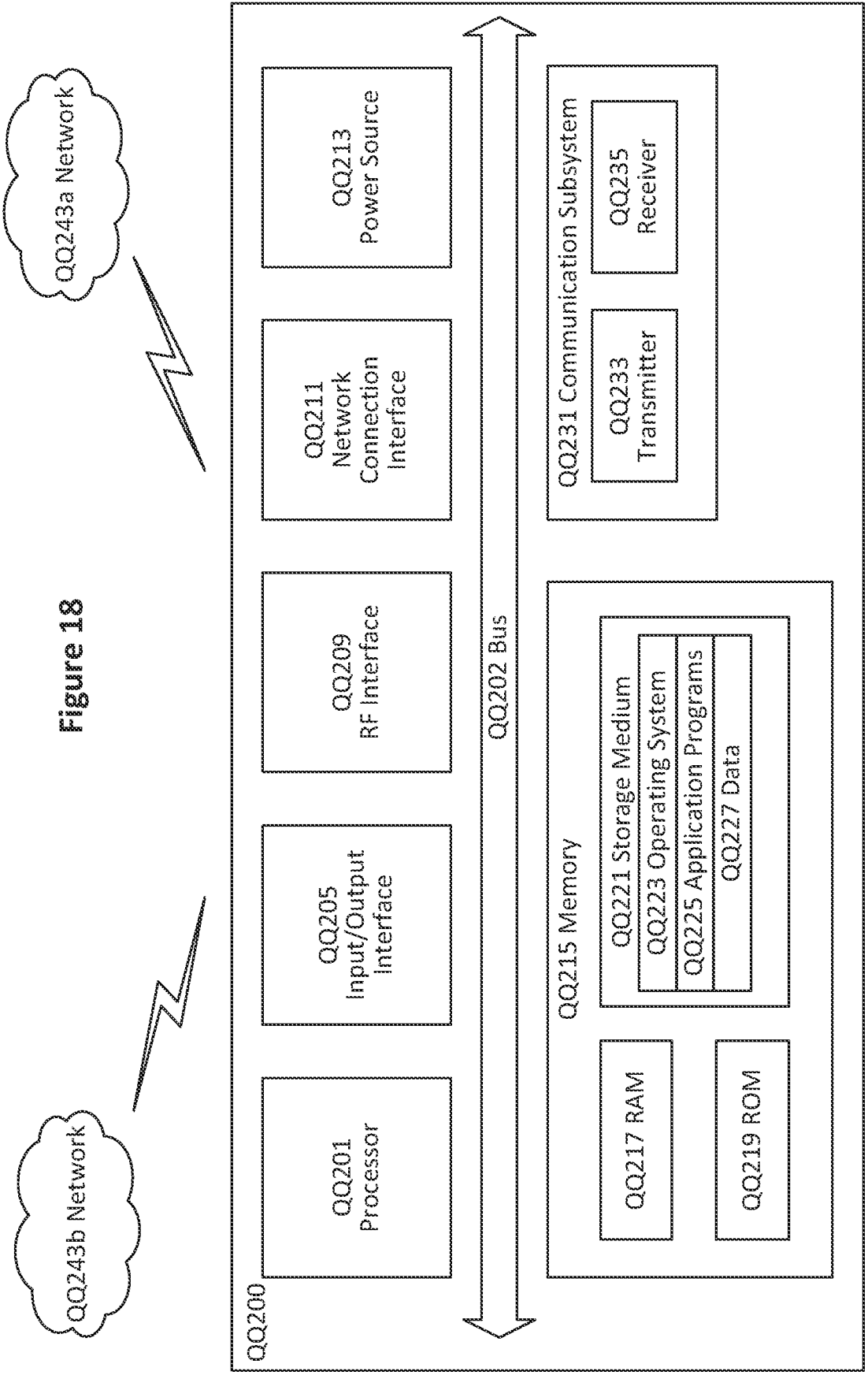
FIG. 18 is a block diagram of a user equipment in accordance with some embodiments

FIG. 18 illustrates a user Equipment in accordance with some embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 18, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 18, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 19:
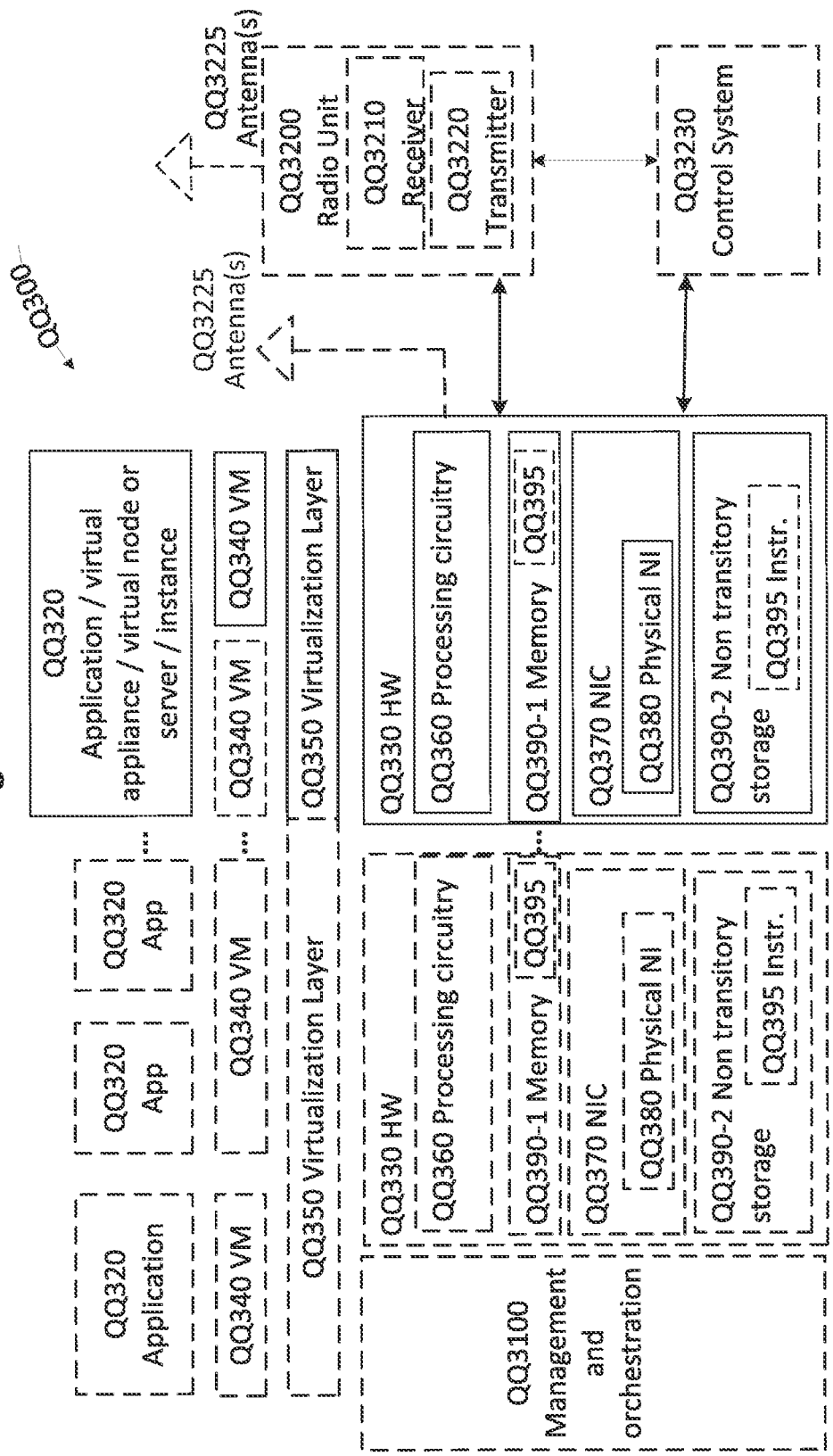
FIG. 19 is a block diagram of a virtualization environment in accordance with some embodiments.

FIG. 19 illustrates a virtualization environment in accordance with some embodiments.

FIG. 19 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 19, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 19.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 20:
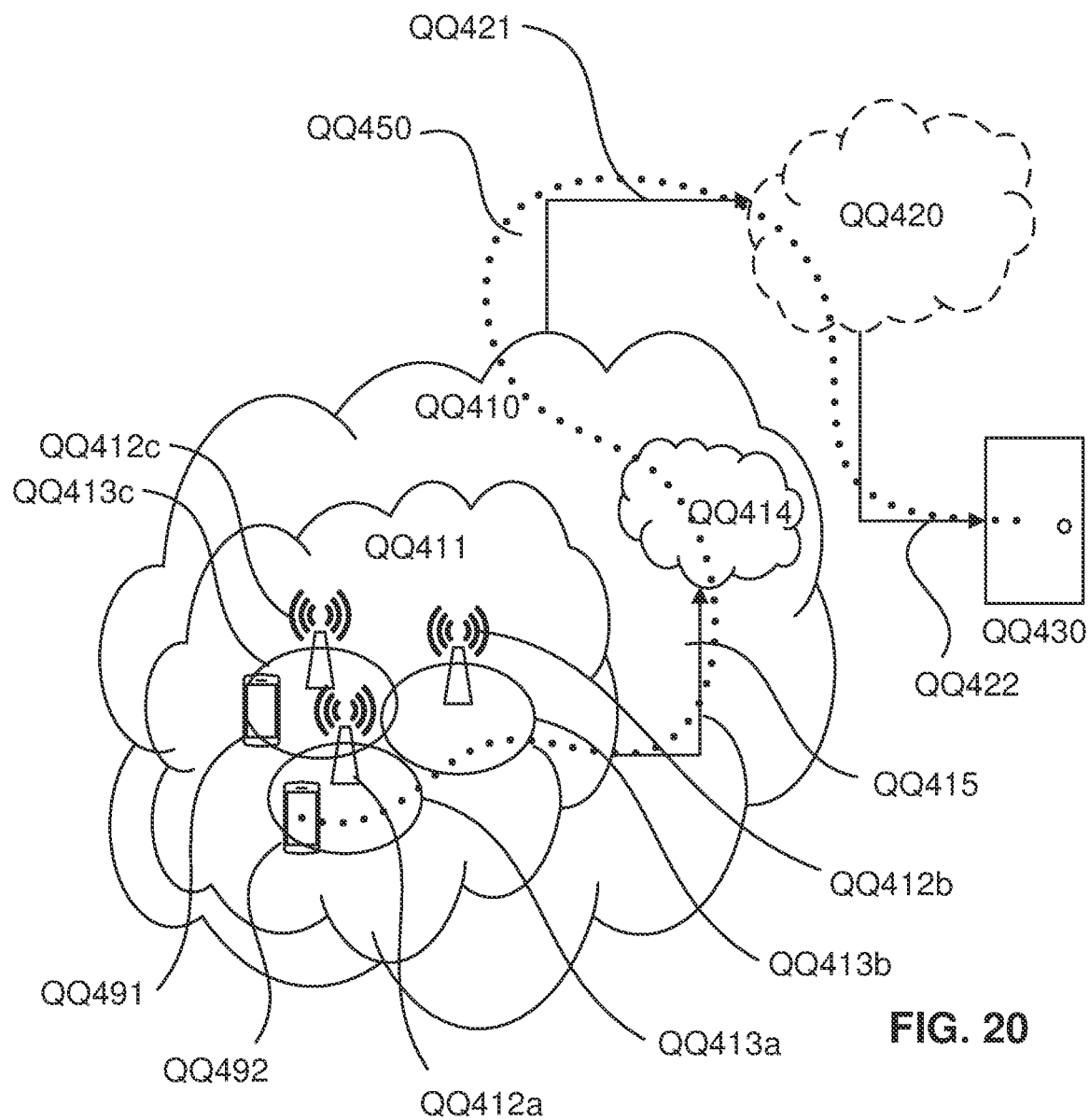
FIG. 20 is a block diagram of a telecommunication network connected via an intermediate network to a host computer in accordance with some embodiments.

FIG. 20 illustrates a telecommunication network connected via an intermediate network to a host computer in accordance with some embodiments.

With reference to FIG. 20, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 20 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 21:
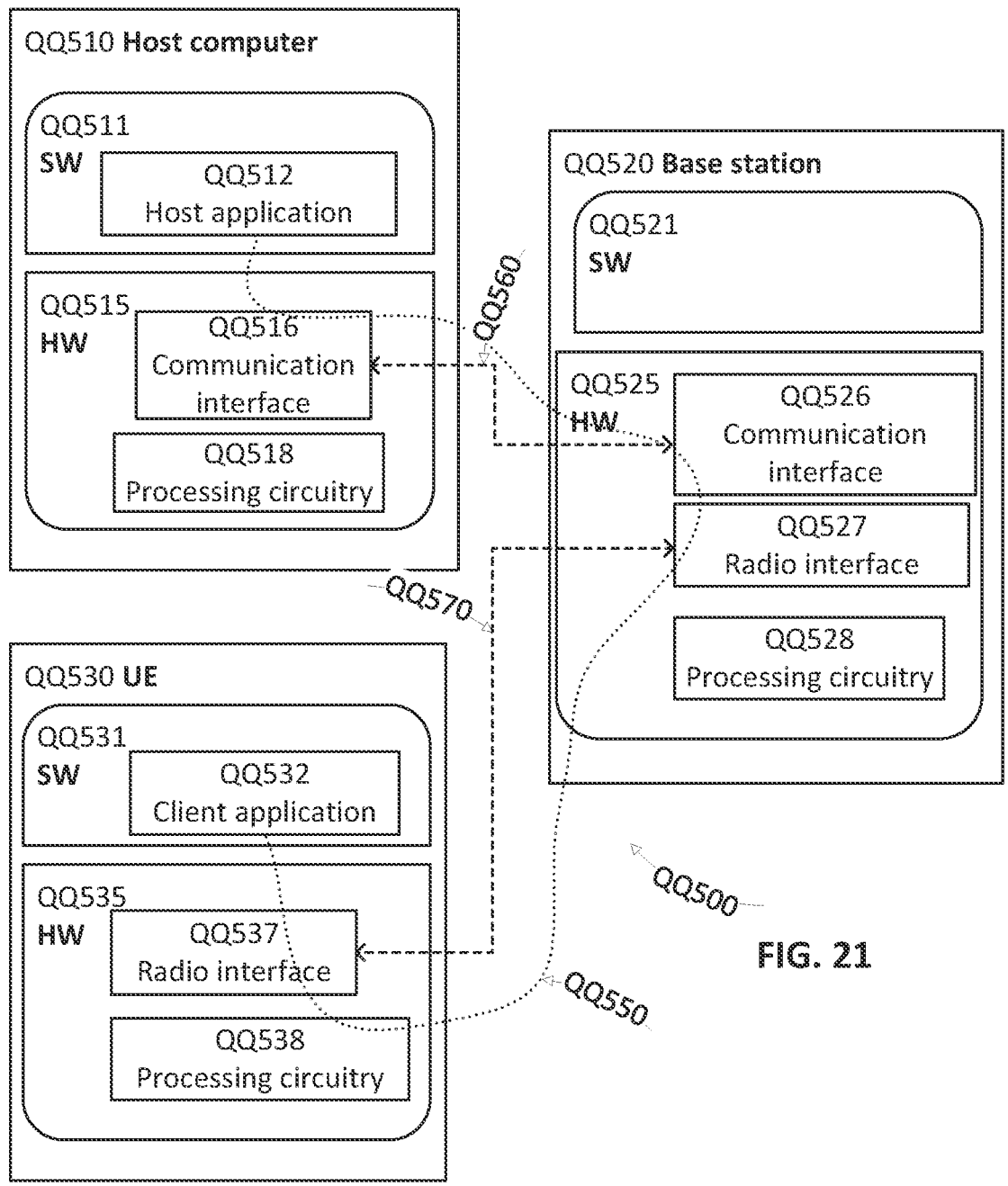
FIG. 21 is a block diagram of a host computer communicating via a base station with a user equipment over a partially wireless connection in accordance with some embodiments.

FIG. 21 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 21. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 21) served by base station QQ520. Communication interface QQ526 may be configured to facilitate connection QQ560 to host computer QQ510. Connection QQ560 may be direct or it may pass through a core network (not shown in FIG. 21) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 21 may be similar or identical to host computer QQ430, one of base stations QQ412a, QQ412b, QQ412c and one of UEs QQ491, QQ492 of FIG. 20, respectively. This is to say, the inner workings of these entities may be as shown in FIG. 21 and independently, the surrounding network topology may be that of FIG. 20.

In FIG. 21, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 22:
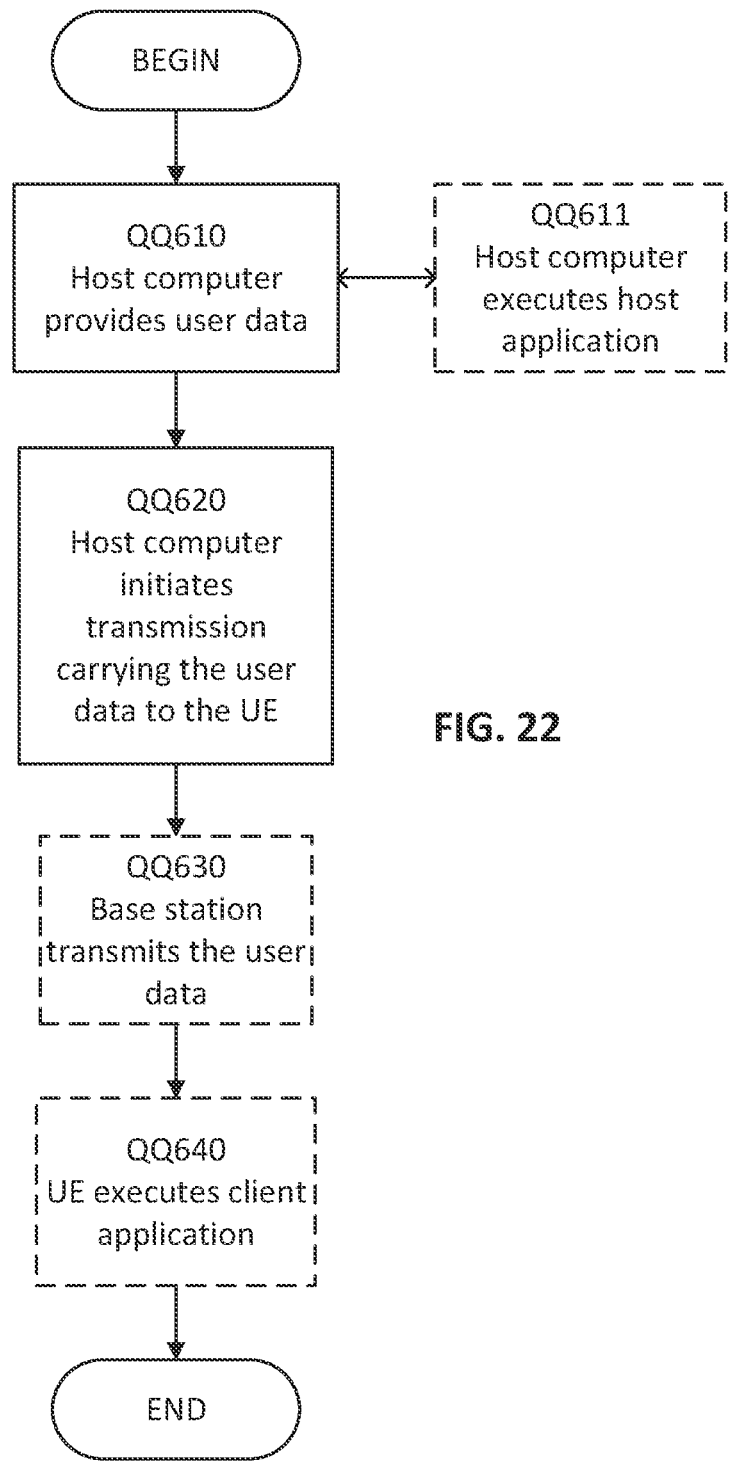
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 23:
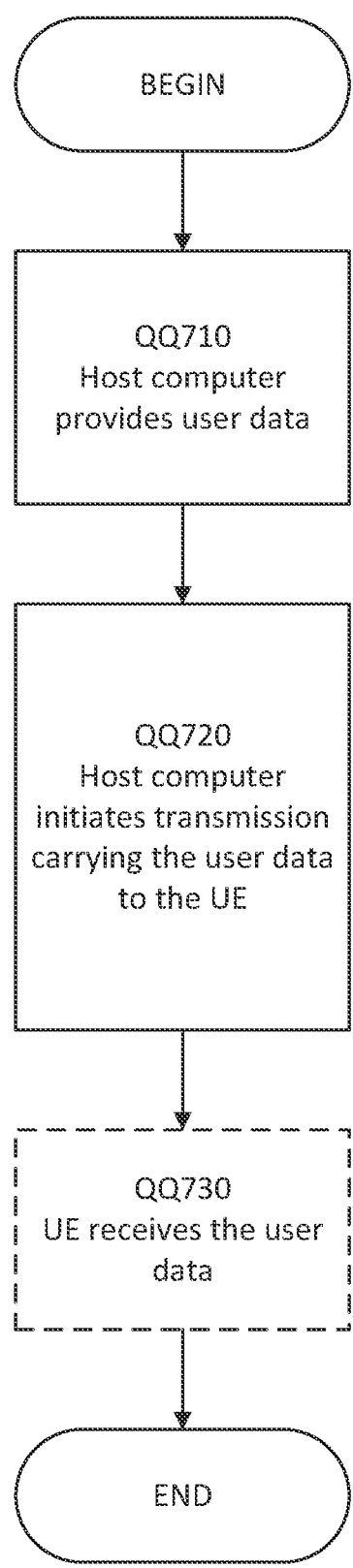
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 24:
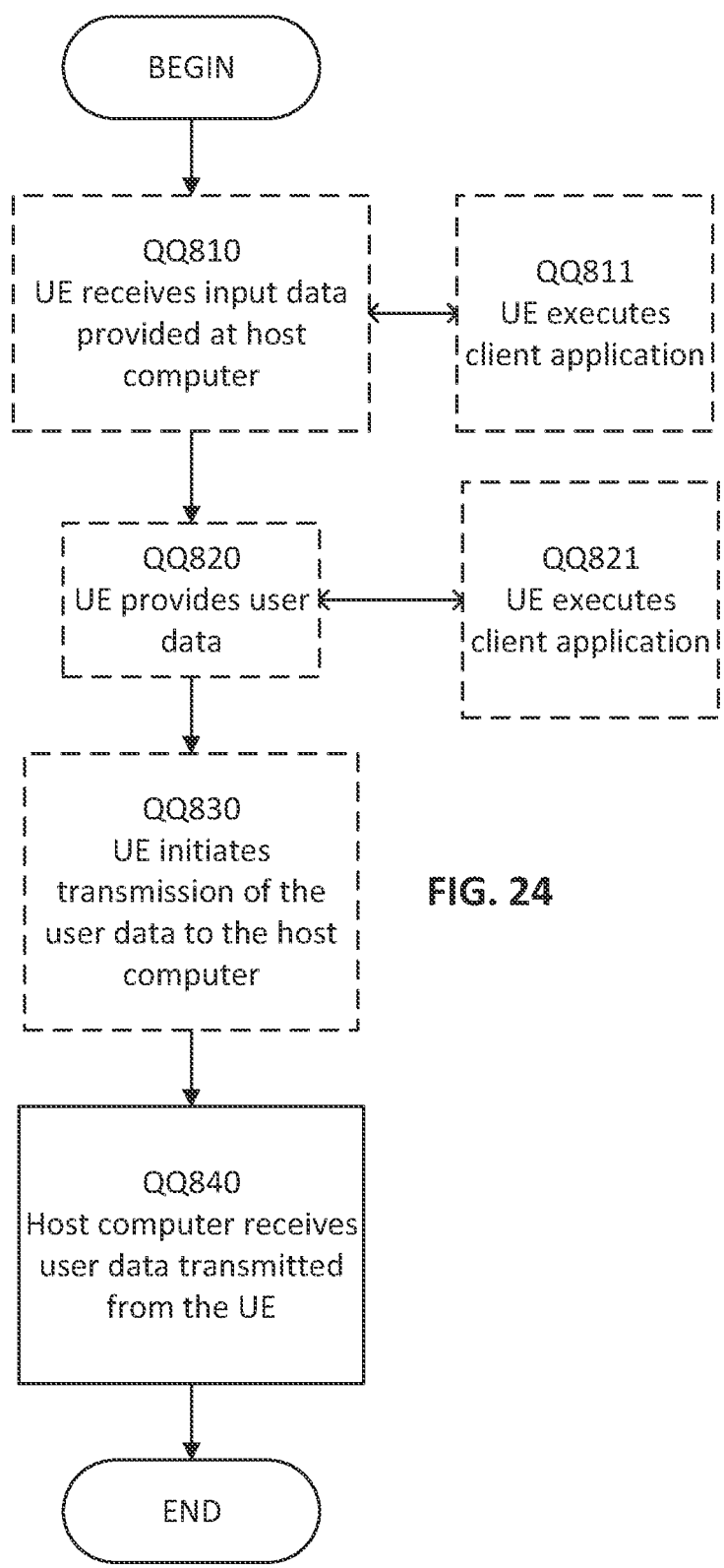
FIG. 24 is a block diagram of methods implemented in a communication system including a host computer, a base station and a user equipment in accordance with some embodiments.

FIG. 24 illustrates methods implemented in a communication system including a host computer, a base station and a user equipment in accordance with some embodiments FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 25:
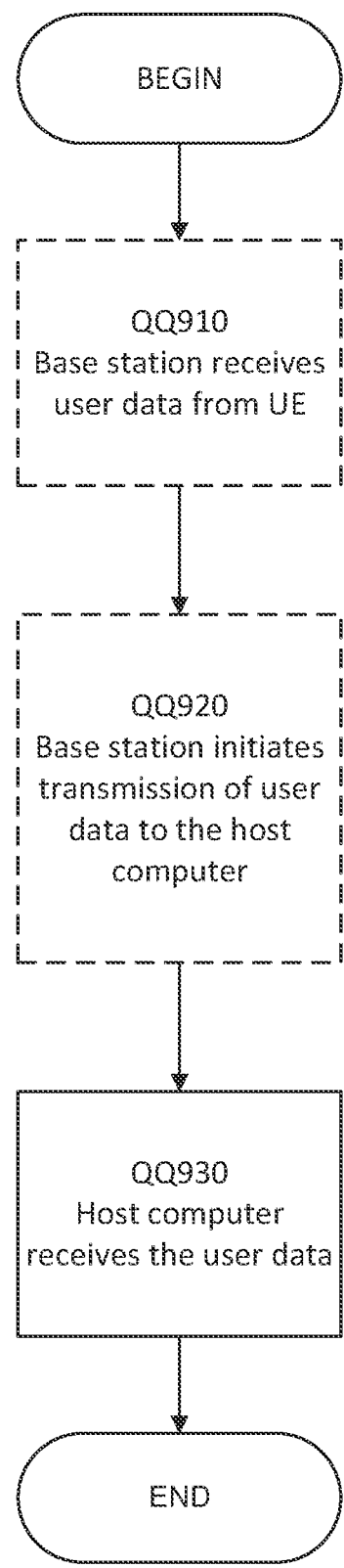
FIG. 25 is a block diagram of methods implemented in a communication system including a host computer, a base station and a user equipment in accordance with some embodiments.

FIG. 25 illustrates methods implemented in a communication system including a host computer, a base station and a user equipment in accordance with some embodiments FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless device providing communication with a wireless network, the method comprising:
registering with a first Public Land Mobile Network, PLMN, having a first PLMN identity;
performing a first plurality of Random Access, RA, procedures while registered with the first PLMN;
storing, in memory, first information related to the first plurality of RA procedures associated with the first PLMN having the first PLMN Identity;
registering with a second PLMN having a second PLMN identity different than the first PLMN identity after registering with the first PLMN and after performing the first plurality of RA procedures;
discarding the first information from the memory responsive to registering with the second PLMN;
performing a second plurality of RA procedures while registered with the second PLMN;
storing, in the memory, second information related to the second plurality of RA procedures associated with the second PLMN having the second PLMN Identity; and
transmitting an information message to the second PLMN, wherein the information message includes a plurality of Random Access Channel, RACH reports corresponding to the second plurality of RA procedures associated with the second PLMN identity based on the second information.

2. The method of claim 1, wherein transmitting the information message comprises transmitting the information message to the second PLMN after performing the second plurality of RA procedures, wherein the information message includes a plurality of RACH reports corresponding to the second plurality of RA procedures associated with the second PLMN identity based on the second information.

3. The method of claim 1, wherein for each one of the first plurality of RA procedures the first information includes the first PLMN identity, and wherein for each one of the second plurality of RA procedures the second information includes the second PLMN identity.

4. The method of claim 3, wherein each one of the plurality of RACH reports corresponding to the second plurality of RA procedures includes the second PLMN identity.

5. The method of claim 1, wherein for each one of the first plurality of RA procedures the first information includes an indication of a number of random access channel, RACH, preambles sent for the respective RA procedure, wherein for each one of the second plurality of RA procedures the second information includes an indication of a number of RACH preambles sent for the respective RA procedure, and wherein each RACH report of the plurality of RACH reports includes the indication of the number of RACH preambles sent for the second plurality of RA procedures.

6. The method of claim 1, wherein for each one of the first plurality of RA procedures the first information includes a contention detected flag indicating whether contention resolution was unsuccessful for at least one of the RACH preambles sent for the respective RA procedure, wherein for each one of the second plurality of RA procedures the second information includes a contention detected flag indicating whether contention resolution was unsuccessful for at least one of the RACH preambles sent for the respective RA procedure, and wherein each RACH report of the plurality of RACH reports includes the contention detected flag for the respective one of the RA procedures for the second plurality of RA procedures.

7. A wireless device, the wireless device comprising:
processing circuitry; and
memory coupled with the processing circuitry, wherein the memory includes instructions that when executed by the processing circuitry causes the wireless device to,
register with a first Public Land Mobile Network, PLMN, having a first PLMN identity,
perform a first plurality of Random Access, RA, procedures while registered with the first PLMN,
store, in memory, first information related to the first plurality of RA procedures associated with the first PLMN having the first PLMN Identity,
register with a second PLMN having a second PLMN identity different than the first PLMN identity after registering with the first PLMN and after performing the first plurality of RA procedures,
discard the first information from the memory responsive to registering with the second PLMN,
perform a second plurality of RA procedures while registered with the second PLMN,
store, in the memory, second information related to the second plurality of RA procedures associated with the second PLMN having the second PLMN Identity, and
transmit an information message to the second PLMN, wherein the information message includes a plurality of Random Access Channel, RACH reports corresponding to the second plurality of RA procedures associated with the second PLMN identity based on the second information.

8. The wireless device of claim 7, wherein transmitting the information message comprises transmitting the information message to the second PLMN after performing the second plurality of RA procedures, wherein the information message includes a plurality of RACH reports corresponding to the second plurality of RA procedures associated with the second PLMN identity based on the second information.

9. The wireless device of claim 7, wherein for each one of the first plurality of RA procedures the first information includes the first PLMN identity, and wherein for each one of the second plurality of RA procedures the second information includes the second PLMN identity.

10. The wireless device of claim 9, wherein each one of the plurality of RACH reports corresponding to the second plurality of RA procedures includes the second PLMN identity.

11. The wireless device of claim 7, wherein for each one of the first plurality of RA procedures the first information includes an indication of a number of random access channel, RACH, preambles sent for the respective RA procedure, wherein for each one of the second plurality of RA procedures the second information includes an indication of a number of RACH preambles sent for the respective RA procedure, and wherein each RACH report of the plurality of RACH reports includes the indication of the number of RACH preambles sent for the second plurality of RA procedures.

12. The wireless device of claim 7, wherein for each one of the first plurality of RA procedures the first information includes a contention detected flag indicating whether contention resolution was unsuccessful for at least one of the RACH preambles sent for the respective RA procedure, wherein for each one of the second plurality of RA procedures the second information includes a contention detected flag indicating whether contention resolution was unsuccessful for at least one of the RACH preambles sent for the respective RA procedure, and wherein each RACH report of the plurality of RACH reports includes the contention detected flag for the respective one of the RA procedures for the second plurality of RA procedures.

13. A computer program product comprising a non-transitory storage medium including program code to be executed by processing circuitry of a wireless device, whereby execution of the program code causes the wireless device to:
register with a first Public Land Mobile Network, PLMN, having a first PLMN identity,
perform a first plurality of Random Access, RA, procedures while registered with the first PLMN;
store, in memory, first information related to the first plurality of RA procedures associated with the first PLMN having the first PLMN Identity;
register with a second PLMN having a second PLMN identity different than the first PLMN identity after registering with the first PLMN and after performing the first plurality of RA procedures;
discard the first information from the memory responsive to registering with the second PLMN;
perform a second plurality of RA procedures while registered with the second PLMN;
store, in the memory, second information related to the second plurality of RA procedures associated with the second PLMN having the second PLMN Identity; and
transmit an information message to the second PLMN, wherein the information message includes a plurality of Random Access Channel, RACH, reports corresponding to the second plurality of RA procedures associated with the second PLMN identity based on the second information.

14. The computer program product of claim 13, wherein transmitting the information message comprises transmitting the information message to the second PLMN after performing the second plurality of RA procedures, wherein the information message includes a plurality of RACH reports corresponding to the second plurality of RA procedures associated with the second PLMN identity based on the second information.

* * * * *

UNITED STATES PATENT AND TRADEMARK OFFICE
CERTIFICATE OF CORRECTION

| | | |
|---|---|---|
| PATENT NO. | : 11,723,081 B2 | |
| APPLICATION NO. | : 17/782853 | |
| DATED | : August 8, 2023 | |
| INVENTOR(S) | : Parichehrehteroujeni et al. | |

It is certified that error appears in the above-identified patent and that said Letters Patent is hereby corrected as shown below:

On the Title Page

On Page 2, in Item (56), under "OTHER PUBLICATIONS", in Column 2, Line 26, delete "P.R.China," and insert -- P.R. China, --, therefor.

In the Drawings

In Figure 8, Sheet 5 of 22, delete "restransmissions" and insert -- retransmissions --, therefor.

In Figure 8, Sheet 5 of 22, delete "matche" and insert -- match --, therefor.

In Figure 17, Sheet 14 of 22, Tag "QQ172 RF", Line 1, delete "TRANCEIVER" and insert -- TRANSCEIVER --, therefor.

In Figure 17, Sheet 14 of 22, Tag "QQ122 RF", Line 1, delete "TRANCEIVER" and insert -- TRANSCEIVER --, therefor.

In the Specification

In Column 1, Line 58, delete "Any" and insert -- any --, therefor.

In Column 2, Line 54, below "false;" insert -- . . . --, as a new sub-point.

In Column 3, Line 32, delete "transmit." and insert -- transmitted. --, therefor.

In Column 3, Line 35, delete "in as" and insert -- as --, therefor.

In Column 4, Line 40, delete "reach" and insert -- reached --, therefor.

In Column 6, Line 58, delete "resource." and insert -- resource, --, therefor.

Signed and Sealed this
Sixteenth Day of July, 2024

*Katherine Kelly Vidal*

Katherine Kelly Vidal
*Director of the United States Patent and Trademark Office*

CERTIFICATE OF CORRECTION (continued)
U.S. Pat. No. 11,723,081 B2

In Column 7, Line 31, delete "described" and insert -- described in --, therefor.

In Column 8, Line 44, delete "attempt" and insert -- attempt of --, therefor.

In Column 11, Line 46, delete "CI-RA" and insert -- CFRA --, therefor.

In Column 13, Line 11, delete "Questions1-8," and insert -- Questions 1-8, --, therefor.

In Column 13, Line 19, delete "provided" and insert -- that provide --, therefor.

In Column 15, Line 16, delete "embodiments" and insert -- embodiments; --, therefor.

In Column 15, Line 16, delete "FIG. 19 is a block" and insert the same on Line 17 before "diagram of a virtualization" as a new paragraph.

In Column 20, Line 39, delete "nodes" and insert -- $node_1$ --, therefor.

In Column 20, Line 44, delete "nodes." and insert -- $node_1$. --, therefor.

In Column 34, Line 16, delete "plurality or" and insert -- plurality of --, therefor.

In Column 40, Line 52, delete "units" and insert -- units. --, therefor.

In Column 40, Line 62, delete "manner" and insert -- manner. --, therefor.

In Column 43, Line 21, delete "(CPE)." and insert -- (CPE), --, therefor.

In Column 43, Line 35, delete "narrow band" and insert -- narrowband --, therefor.

In Column 45, Line 15, delete "manner" and insert -- manner. --, therefor.

In Column 47, Line 2, delete "interchangeable." and insert -- interchangeably. --, therefor.

In Column 54, Line 40, delete "embodiments" and insert -- embodiments. --, therefor.

In Column 55, Line 12, delete "embodiments" and insert -- embodiments. --, therefor.

In Column 55, Line 39, delete "embodiments" and insert -- embodiments. --, therefor.

In Column 56, Line 7, delete "according one" and insert -- according to one --, therefor.

In Column 58, Line 13, delete "WLAN Wide Local Area Network" and insert -- WLAN Wireless Local Area Network --, therefor.

CERTIFICATE OF CORRECTION (continued)
U.S. Pat. No. 11,723,081 B2

In the Claims

In Column 60, Line 30, in Claim 1, delete "RACH" and insert -- RACH, --, therefor.

In Column 61, Line 33, in Claim 7, delete "RACH" and insert -- RACH, --, therefor.

In Column 62, Line 26, in Claim 13, delete "identity," and insert -- identity; --, therefor.